United States Patent
Shako et al.

(10) Patent No.: US 8,472,578 B2
(45) Date of Patent: Jun. 25, 2013

(54) RADIO APPARATUS, RADIO APPARATUS CONTROLLER, AND SYNCHRONIZATION ESTABLISHING METHOD

(75) Inventors: Hideharu Shako, Kawasaki (JP); Takeshi Ohba, Kawasaki (JP); Satoshi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/363,831

(22) Filed: Feb. 1, 2012

(65) Prior Publication Data
US 2012/0250738 A1 Oct. 4, 2012

(30) Foreign Application Priority Data

Mar. 30, 2011 (JP) ................................. 2011-076805
Dec. 5, 2011 (JP) ................................. 2011-265704

(51) Int. Cl.
*H04L 7/00* (2006.01)

(52) U.S. Cl.
USPC ........... 375/354; 375/219; 375/326; 375/358; 375/376

(58) Field of Classification Search
USPC ........................ 375/219, 326, 354, 358, 376
See application file for complete search history.

(56) References Cited

U.S. PATENT DOCUMENTS

| 8,027,423 | B2 * | 9/2011 | Higashino | 375/376 |
| 8,300,754 | B2 * | 10/2012 | Nedovic et al. | 375/355 |
| 8,358,566 | B1 * | 1/2013 | Oberg et al. | 369/47.48 |

FOREIGN PATENT DOCUMENTS

JP 5-316251 11/1993

OTHER PUBLICATIONS

"CPRI Specification V4.2 (Sep. 29, 2010)", [online] Internet URL:http://www.cpri.info/downloads/CPRI_v_4_2_2010-09-09.pdf, Mar 16, 2011, pp. 1-113.

* cited by examiner

*Primary Examiner* — Ted Wang
(74) *Attorney, Agent, or Firm* — Fujitsu Patent Center

(57) ABSTRACT

A radio apparatus includes: first and second reception units to receive first and second signals from first and second radio apparatus controllers, respectively; first and second synchronous clock generation units to generate first and second recovery clocks from clock components included in the first and second signals received by the reception units, respectively; a clock synchronization detection unit to detect whether or not the second recovery clock is synchronous with the first recovery clock; a code selection unit to select a code indicating the synchronous state according to a detection result of the synchronization detection unit; a signal processing unit of generate a third signal to which the code selected by the code selection unit is added and which is synchronous with the first recovery clock; and a transmission unit to transmit the third signal generated by the signal processing unit to the second radio apparatus controller.

17 Claims, 25 Drawing Sheets

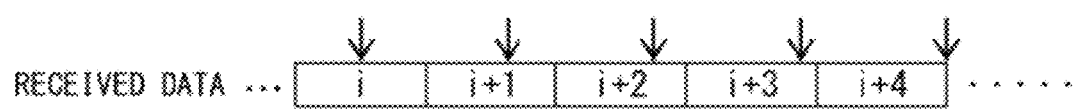
F I G. 3

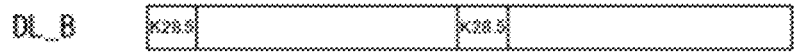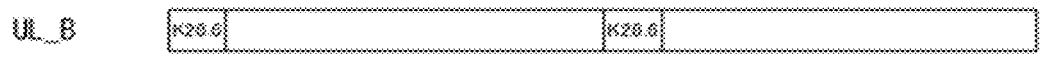
(a)
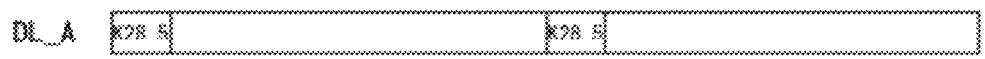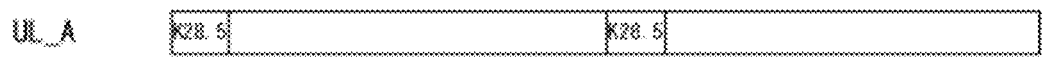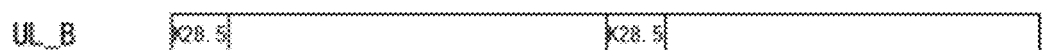
(b)
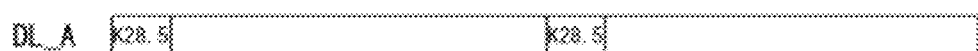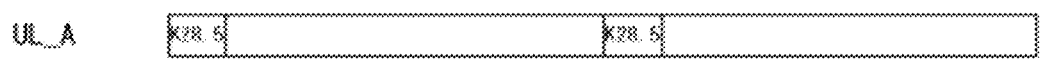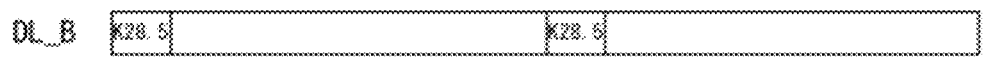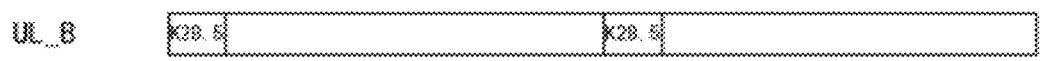
(c)
FIG. 9

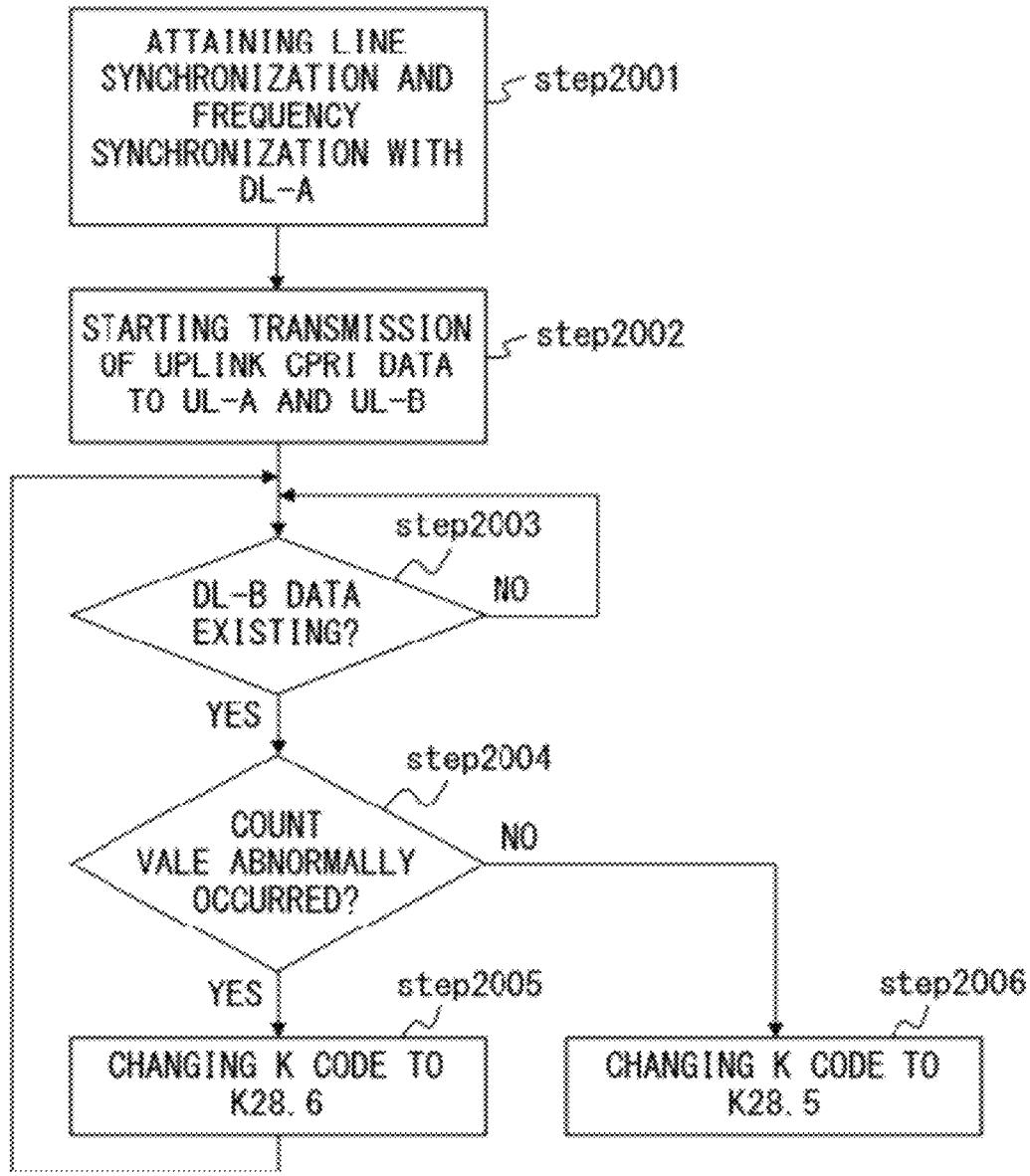
F I G. 2 0

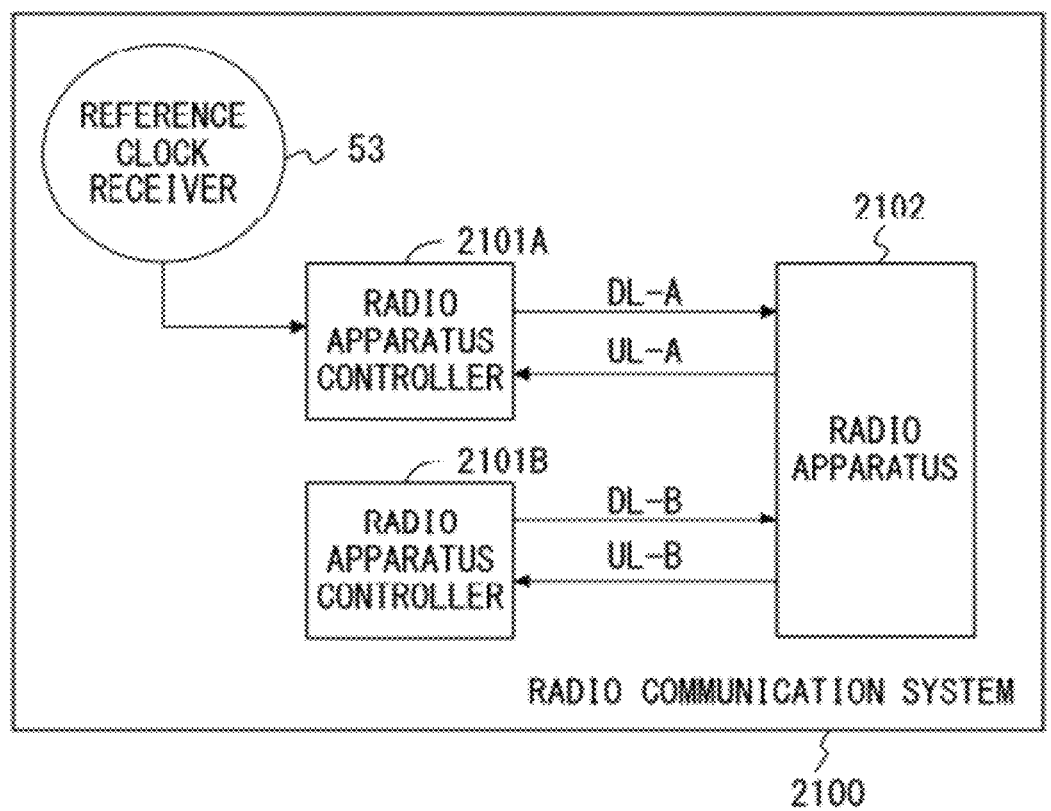
F I G. 21

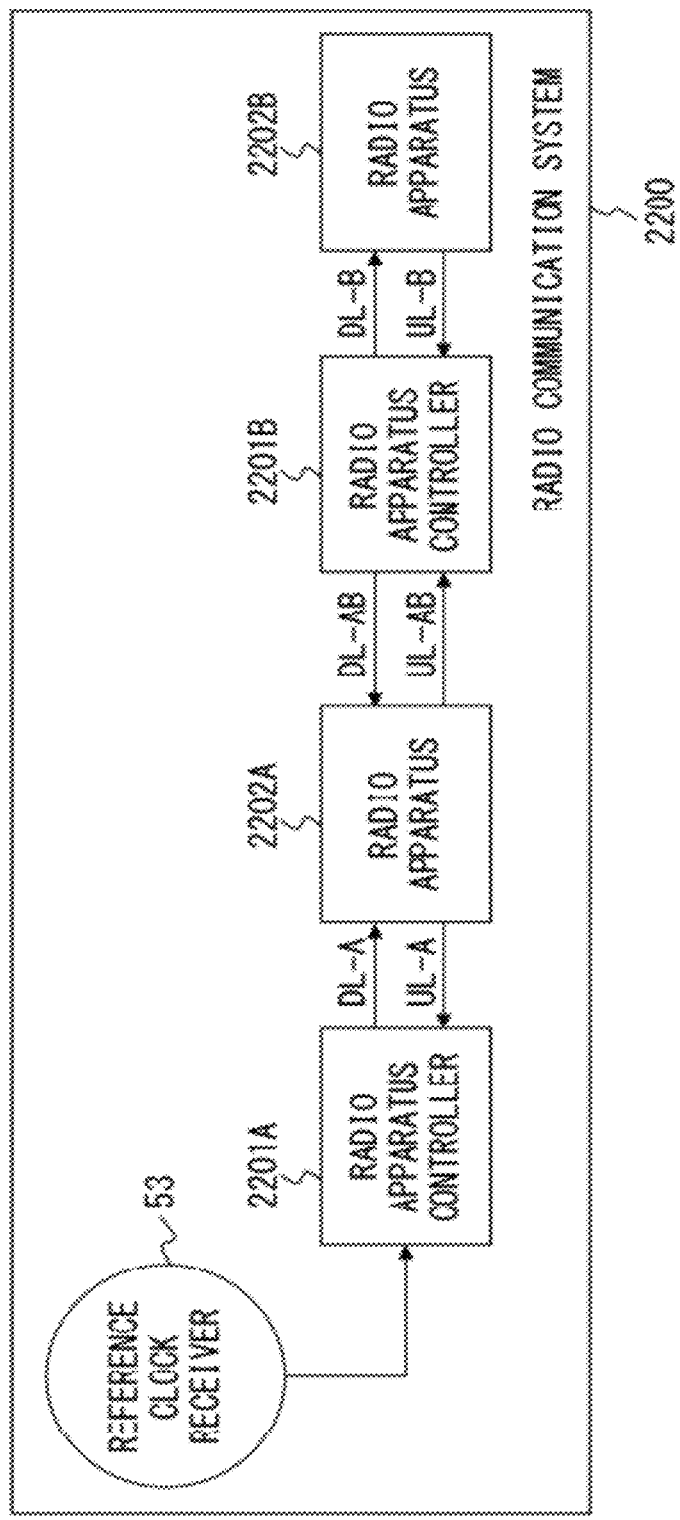
F I G. 22

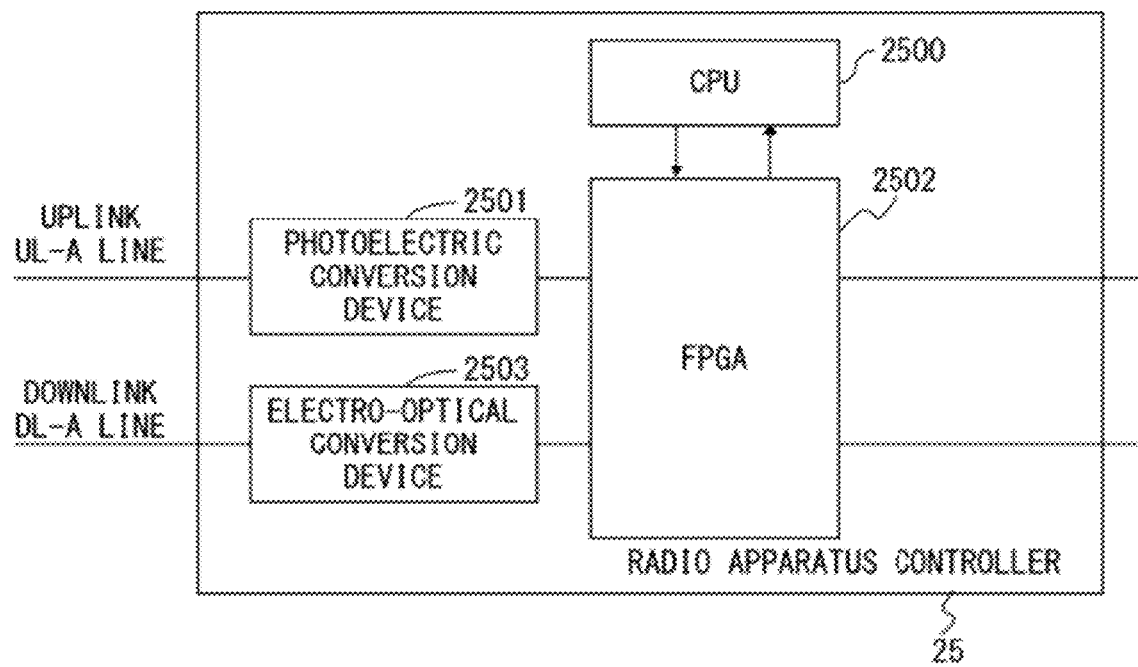
F I G. 2 5

RADIO APPARATUS, RADIO APPARATUS CONTROLLER, AND SYNCHRONIZATION ESTABLISHING METHOD

CROSS-REFERENCE TO RELATED APPLICATIONS

This application is based upon and claims the benefit of priority of the prior Japanese Application No. 2011-076805, field on Mar. 30, 2011, and Japanese Application No. 2011-265704, filed on Dec. 5, 2011, the entire contents of which are incorporated herein by reference.

FIELD

The present invention relates to a radio apparatus, a radio apparatus controller, and a synchronization establishing method for synchronizing with the operation clock of a first radio apparatus controller the operation clock of a second radio apparatus controller without increasing the circuit size of the radio apparatus for establishment of synchronization.

BACKGROUND

Recently in the field of a radio communication system, a system in which a radio base station equipment is divided into a apparatus for processing a baseband signal and a apparatus for modulating, demodulating and amplifying a radio signal, and these apparatuses are connected through an optical cable has been standardized. The system corresponds to the Common Public Interface (CPRI) Standard, the Open Base Station Standard Initiative (OBSAI) Standard, etc.

In addition, in order to increase data traffic with a recent drastic increasing demand for radio communications, each communication common carrier is shifting to a communication system in which a communication method having higher frequency efficiency is used. For example, a communication method is changed from Wideband Code Division Multiple Access (WCDMA) to Long Term Evolution (LTE), etc. Thus, when a radio communication system is shifted to a new radio communication system in which a different communication method is used, the existing radio communication system and the new radio communication system transitionally coexist.

FIG. 1 is the configuration in which a plurality of radio communication systems coexist in the prior art. In FIG. 1, for example, a radio communication system 1A corresponds to an existing radio communication system, and a radio communication system 1B corresponds to a new radio communication system. In FIG. 1, the above-mentioned apparatus for processing the baseband signal corresponds to radio apparatus controllers 11A and 11B such as Radio Equipment Control (REC). The above-mentioned apparatus for modulating, demodulating and amplifying a radio signal corresponds to radio apparatuses 12A-1 through 12A-3 and 12B-1 through 12B-3 such as Radio Equipment (RE).

In FIG. 1, the radio apparatus controller 11A or 11B is included in each radio communication system. However, each radio communication system can be provided with a plurality of radio apparatus controllers.

In addition, in FIG. 1, the radio apparatus controllers 11A and 11B are connected to the three radio apparatuses 12A-1 through 12A-3 and 12B-1 through 12B-3, respectively. However, the number of radio apparatuses connected to each of the radio apparatus controllers 11A and 11B is not limited to three.

The radio apparatus controller 11A stably generates a correct reference clock using an absolute time of a global positioning system (GPS) signal etc. received by a reference clock receiver 13A. The radio apparatus controller 11A operates in synchronization with the generated reference clock. Then, the radio apparatus controller 11A superposes a clock component for synchronization on a downlink signal to the radio apparatuses 12A-1 through 12A-3, and transmits the result signal to the radio apparatuses 12A-1 through 12A-3 through optical cables 14A-1 through 14-3.

The radio apparatuses 12A-1 through 12A-3 extract the clock component superposed on the downlink signal received from the radio apparatus controller 11A from the downlink signal, thereby generating a recovery clock. Then, the radio apparatuses 12A-1 through 12A-3 operate in synchronization with the generated recovery clock. Thus, the radio apparatuses 12A-1 through 12A-3 can attain frequency synchronization with the radio apparatus controller 11A.

On the other hand, the radio apparatus controller 11B stably generates a correct reference clock using an absolute time of a GPS signal etc. received by a reference clock receiver 13B. The radio apparatus controller 11B operates in synchronization with the generated reference clock. Then, the radio apparatus controller 11B superposes a clock component for synchronization on a downlink signal to the radio apparatuses 12B-1 through 12B-3, and transmits the result signal to the radio apparatuses 14B-1 through 14B-3 through optical cables.

The radio apparatuses 12B-1 through 12B-3 extract the clock component superposed on the downlink signal received from the radio apparatus controller 11B from the downlink signal, thereby generating a recovery clock. Then, the radio apparatuses 12B-1 through 12B-3 generate an operation clock in synchronization with the generated recovery clock. Thus, the radio apparatuses 12A-1 through 12A-3 can attain frequency synchronization with the radio apparatus controller 11B.

As illustrated in FIG. 1, in the conventional configuration in which a plurality of radio communication systems coexist, the facility investment for the radio apparatus, the radio apparatus controller, etc. on a new radio communication system is newly performed.

However, as indicated by the above example of changing a communication method from the WCDMA to the LTE, when a change is made to a new radio communication system using the same frequency band as the existing radio communication system, it is hard to devise a confliction with the existing antenna facility because it is necessary to consider the isolation of the transmission power between antennas etc. Furthermore, separately providing radio apparatuses including the antennas having the same frequency band for the existing radio communication system and a new radio communication system is not advantageous in facility cost and in securing the installation location.

In addition, a large number of radio apparatus controllers can be installed in one radio communication system. Therefore, further providing a reference clock receiver having the same function not only for a radio apparatus controller of an existing radio communication system but also for a radio apparatus controller of a new radio communication system is not advantageous in facility cost. In addition, since it is necessary for the reference clock receiver to be provided in a position where radio waves can be received, it is necessary to check the applicability of the installation location.

Therefore, it is requested to share a radio apparatus including an antenna facility among a plurality of radio communication systems, and provide for one of the plurality of radio communication systems a reference clock receiver to receive a GPS signal etc. for use in stably generating a correct reference clock.

FIG. 2 illustrates the configuration in which there are a plurality of radio communication systems in which a radio apparatus is shared among a plurality of radio communication systems and a reference clock receiver is provided for one of the plurality of radio communication systems.

In FIG. 2, radio apparatuses 22C-1 through 22C-3 including antenna facilities are shared by radio communication systems 2A and 2B. That is, in FIG. 2, a radio apparatus controller 21A and radio apparatuses 22C-1 through 22C-3 in the radio communication system 2A are connected through optical cables 24A-1 through 24A-3, respectively. In addition, a radio apparatus controller 21B and the radio apparatuses 22C-1 through 22C-3 in the radio communication system 2B are connected through optical cables 24B-1 through 24B-3, respectively.

In addition, a reference clock receiver 23A is provided for the radio apparatus controller 21A, and no reference clock receiver is provided for the radio apparatus controller 21B.

In the configuration in which a plurality of radio communication systems coexist as illustrated in FIG. 2, the installation cost for radio apparatus, a reference clock receiver, etc. can be reduced. Furthermore, the problem with the analog characteristics such as the guarantee of the isolation between antennas etc. can be solved.

However, in the configuration in which the plurality of radio communication systems coexist as illustrated in FIG. 2, no reference clock receiver is installed for radio apparatus controller 21B. Therefore, the radio apparatus controller 21B operates in synchronization with the built-in clock generated from the oscillator provided in the radio apparatus controller 21B. Accordingly, the operation clock of the radio apparatus controller 21A and the operation clock of the radio apparatus controller 21B can enter the asynchronous state. As a result, there occurs a time difference in clock frequency between the downlink signal from the radio apparatus controller 21A to the radio apparatuses 22C-1 through 22C-3 and the downlink signal from the radio apparatus controller 21B to the radio apparatuses 22C-1 through 22C-3.

FIG. 3 is an explanatory view of an occurrence of an error caused by frequency asynchronous in the data transfer.

For example, it is assumed that the radio apparatuses 22C-1 through 22C-3 illustrated in FIG. 2 operate in synchronization with the clock component included in the downlink signal received from the radio apparatus controller 21A provided with the reference clock receiver 23A. In this case, it is assumed that the radio apparatuses 22C-1 through 22C-3 have received the downlink signal in which a time difference from the downlink signal from the radio apparatus controller 21A has occurred in the clock frequency, from the radio apparatus controller 21B. Then, it is also assumed that the radio apparatuses 22C-1 through 22C-3 have sampled the downlink signal received from the radio apparatus controller 21B in synchronization with the clock component included in the downlink signal received from the radio apparatus controller 21A.

In the case in which the above-mentioned assumptions have been made, the received data illustrated in FIG. 3 corresponds to the data of the downlink signal received from the radio apparatus controller 21B. In addition, the sampling period expressed by the interval indicated by the arrows in FIG. 3 corresponds to the sampling period in synchronization with the clock component included in the downlink signal received from the radio apparatus controller 21A.

As illustrated in FIG. 3, if there occurs a time difference between the bit rate of the received data and the sampling speed of the radio apparatus, an error in data transfer such as a FIFO (first in first out) empty or a FIFO overflow may be caused although a clock transfer is performed using the FIFO so that a data loss does not occur.

The occurrence of a data transfer error may cause line quality degradation. Furthermore, since it is necessary to retransmit erroneous data from the radio apparatus controller 21B to the radio apparatus 22C-1 through 22C-3, it causes the degradation of throughput in the entire system.

Furthermore, in order to suppress the occurrence of an error in data transfer as described above, it is necessary for the radio apparatuses 22C-1 through 22C-3 to multiplex the downlink signal received from the radio apparatus controller 21A and the downlink signal received from the radio apparatus controller 21B by considering the time difference in clock frequency between the downlink signals.

FIG. 4 is an example of the conventional circuit configuration of a radio apparatus when the frequency synchronization is not attained between the downlink signals received from a plurality of radio apparatus controllers.

In the radio apparatus 4 in FIG. 4, a downlink signal A is a downlink signal received from the radio apparatus controller operating in synchronization with the reference clock generated by using an absolute time of a GPS signal etc. A downlink signal B is a downlink signal received from the radio apparatus controller operating in synchronization with a built-in clock in the radio apparatus controller.

In the radio apparatus 4 illustrated in FIG. 4, the downlink signal A is converted from an optical signal to an electric signal by a photoelectric conversion unit 401A. Furthermore, the downlink signal B is converted from an optical signal to an electric signal by a photoelectric conversion unit 401B.

The radio apparatus 4 performs the following process before multiplexing a data signal A extracted from the downlink signal A converted into the electric signal and a data signal B extracted from the downlink signal B converted into the electric signal.

A synchronous clock generation unit 402A generates a recovery clock A from the downlink signal A. In addition, a downlink signal processing unit 403A extracts the data signal A from the downlink signal A.

On the other hand, asynchronous clock generation unit 402B generates a recovery clock B from the downlink signal B. Furthermore, the downlink signal processing unit 403B extracts the data signal B from the downlink signal B.

The extracted data signal B is modulated by a modulation unit 405B according to the recovery clock B. Then, the modulated data signal B is resampled by a processing speed conversion unit 406 according to the recovery clock A to attain synchronization with the data signal A.

That is, in the processing speed conversion unit 406, the modulated data signal B is converted into an analog signal by a digital/analog conversion unit 406-1, and then resampled according to the recovery clock A. Then, the resampled data signal B is converted into a data signal by an analog/digital conversion unit 406-2.

After the conversion through the processing speed conversion unit 406, the data signal B is remodulated by a modulation unit 407B according to the clock signal A.

On the other hand, the data signal A extracted by the downlink signal processing unit 403A is phase-adjusted with the data signal B by a delay adjustment unit 404.

As described above, it is necessary to process the data signal B by the processing speed conversion unit 406 to attain synchronization with the data signal A. Therefore, the delay adjustment unit 404 performs the phase adjustment on the data signal A in accordance with the time required to perform the process on the data signal B by the processing speed conversion unit 406.

The phase-adjusted data signal A is modulated by a modulation unit 405A.

After the above-mentioned process, the data signals A and B are multiplexed by a signal multiplexing unit 408. Then, the multiplexed data signals A and B are improved the distortion characteristics to be occurred by an amplification unit 410 by peak suppression and distortion compensation unit 409, and then amplified into transmission power by the amplification unit 410.

As described above, when there is a time difference in clock frequency between the downlink signals received from a plurality of radio apparatus controllers, it is necessary to provide in the radio apparatus a processing speed conversion unit for attaining synchronization, thereby increasing the circuit size of the radio apparatus. In addition, since the resampling of a data signal by the processing speed conversion unit generates a quantization error of baseband data, the communication quality is degraded. Furthermore, since it is necessary for the radio apparatus to perform processes according to a plurality of clocks, the clock system of the radio apparatus becomes complicated.

As the prior art relating to the subordinate synchronization in an integrated services digital network (IDSN), the following technique is disclosed. That is, clock components are extracted from the received signals of a plurality of basic interfaces and a primary group speed interface to generate a frame pulse, and a net subordinate clock synchronous with a frame pulse corresponding to a normal ISDN line in the generated frame pulses is generated.

Patent Document 1: Japanese Laid-open Patent Publication No. 5-316251

Non-patent Document 1: "CPRI Specification v4.2(2010-09-29)", [online], [retrieved on Mar. 16, 2011], Internet <URL: http://www.cpri.info/downloads/CPRI_v_4_2_2010-09-29.pdf>

SUMMARY

According to an aspect of the invention, a radio apparatus includes: a first reception unit configured to receive a first signal from a first radio apparatus controller; a first synchronous clock generation unit configured to generate a first recovery clock from a clock component included in the first signal received by the reception unit; a second reception unit configured to receive a second signal from a second radio apparatus controller; a second synchronous clock generation unit configured to generate a second recovery clock from a clock component included in the second signal received by the reception unit; a clock synchronization detection unit configured to detect whether or not the second recovery clock is synchronous with the first recovery clock; a code selection unit configured to select a code indicating whether or not the second recovery clock is synchronized with the first recovery clock according to a detection result of the synchronization detection unit; a signal processing unit configured to generate a third signal to which the code selected by the code selection unit is added and which is synchronous with the first recovery clock; and a transmission unit configured to transmit the third signal generated by the signal processing unit to the second radio apparatus controller.

According to an aspect of the invention, a radio apparatus controller includes: a reception unit configured to receive from a radio apparatus a third signal to which a code selected depending on whether or not a first recovery clock generated from a first signal received from a first radio apparatus controller and a second recovery clock generated from a second signal received from a second radio apparatus controller are synchronous with each other is added; a code detection unit configured to detect a code included in the third signal received by the reception unit; an operation clock synchronization establishment unit configured to synchronize an operation clock with a third recovery clock generated from the third signal received from the radio apparatus according to the code detected by the code detection unit; a signal processing unit configured to generate a fourth signal according to the operation clock synchronized by the operation clock synchronization establishment unit; and a transmission unit configured to transmit the fourth signal generated by the signal processing unit to the radio apparatus.

According to an aspect of the invention, a synchronization establishing method includes: receiving by a radio apparatus a first signal from a first radio apparatus controller; generating by the radio apparatus a first recovery clock from a clock component included in the first signal; receiving by the radio apparatus a second signal from a second radio apparatus controller; generating by the radio apparatus a second recovery clock from a clock component included in the second signal; detecting by the radio apparatus whether or not the second recovery clock is synchronous with the first recovery clock; selecting by the radio apparatus a code indicating whether or not the second recovery clock is synchronized with the first recovery clock according to a detection result; generating by the radio apparatus a third signal to which the selected code is added and which is synchronous with the first recovery clock; transmitting by the radio apparatus the generated third signal to the second radio apparatus controller; receiving by the second radio apparatus controller the third signal transmitted from the radio apparatus; detecting by the second radio apparatus controller a code included in the received third signal; synchronizing by the second radio apparatus controller an operation clock with a third recovery clock generated from the third signal received from the radio apparatus according to the detected code; generating by the second radio apparatus controller a fourth signal according to the synchronized operation clock; and transmitting by the second radio apparatus controller the generated fourth signal to the radio apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory view of an occurrence of an error caused by frequency asynchronous in the data transfer;

FIG. 9 is the schematic illustration of a signal of an uplink line and a signal of a downlink line in the configuration in which a plurality of radio communication systems coexist according to an embodiment of the present invention;

FIG. 20 is a flowchart of the process performed by the radio apparatus controller and the radio apparatus according to an embodiment of the present invention;

FIG. 21 illustrates the first example of the configuration of the same radio communication system;

FIG. 22 illustrates the second example of the configuration of the same radio communication system;

FIG. 25 illustrates an example of the hardware configuration of the radio apparatus controller according to an embodiment of the present invention.

DESCRIPTION OF EMBODIMENTS

The embodiments of the present invention are described below in detail with reference to the attached drawings.

In the following descriptions of the embodiments of the present invention, the CPRI standard is exemplified as a connection interface between the radio apparatus controller and the radio apparatus. However, the embodiments of the present invention are also applicable to other connection interfaces such as OBSAI standard etc.

Figure 5:
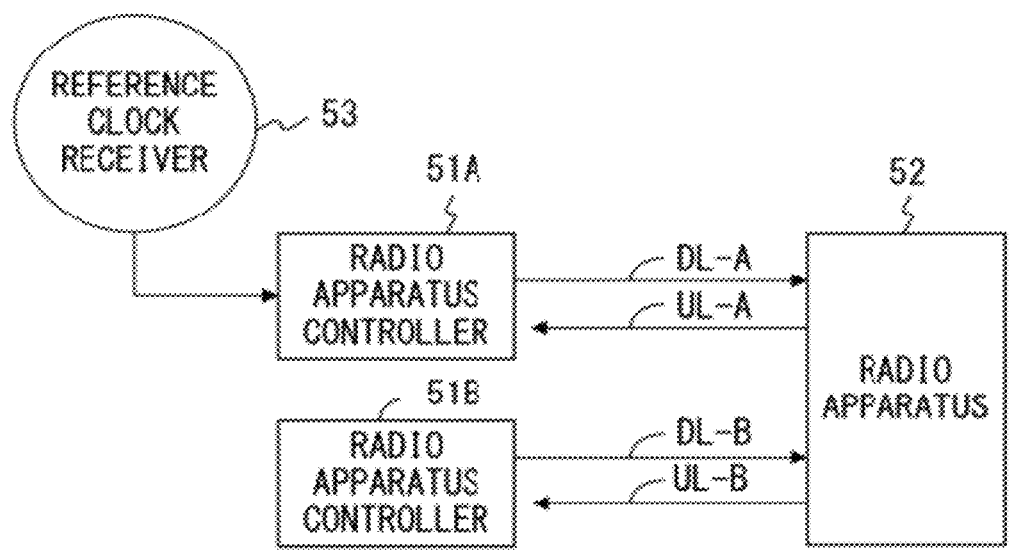
FIG. 5 illustrates an example of a configuration in which radio apparatus controllers in different radio communication systems are connected to a radio apparatus.

FIG. 5 illustrates an example of a configuration in which radio apparatus controllers in different radio communication systems are connected to a radio apparatus.

In FIG. 5, a radio apparatus controller 51A and a radio apparatus controller 51B are radio apparatus controllers in different radio communication systems. Different radio communication systems refer to radio communication systems in each of which a different communication method is used. For example, a radio communication system in which the WCDMA is used and a radio communication system in which the LTE is used are different communication systems.

The radio apparatus controller 51A operates in synchronization with the reference clock generated stably and correctly by using an absolute time of a GPS signal etc. from a reference clock receiver 53. The radio apparatus controller 51B starts its operation in synchronization with the built-in clock in the radio apparatus controller 51B.

In FIG. 5, a downlink DL-A refers to a CPRI connection in the downstream direction from the radio apparatus controller 51A to a radio apparatus 52. An uplink UL-A refers to a CPRI connection in the upstream direction from the radio apparatus 52 to the radio apparatus controller 51A. A downlink DL-B refers to a CPRI connection in the downstream direction from the radio apparatus controller 51B to the radio apparatus 52. An uplink UL-B refers to a CPRI connection in the upstream direction from the radio apparatus 52 to the radio apparatus controller 51B.

In the embodiment of the present invention, the radio apparatus controller 51A, the radio apparatus controller 51B, and the radio apparatus 52 perform the following processes.

The radio apparatus 52 receives a CPRI signal of the downlink DL-A transmitted from the radio apparatus controller 51A. The radio apparatus 52 generates a recovery clock by extracting the clock component superposed on the received CPRI signal of the downlink DL-A, and establishes the synchronization between the generated recovery clock and the operation clock of the radio apparatus 52. Then, the radio apparatus 52 transmits to the radio apparatus controller 51A a CPRI signal of the uplink UL-A which is frequency-synchronous with the CPRI signal of the downlink DL-A.

In addition, the radio apparatus 52 transmits to the radio apparatus controller 51B a CPRI signal of the uplink UL-B which is frequency-synchronous with the CPRI signal of the downlink DL-A received from the radio apparatus controller 51A at the same timing in which the CPRI signal of the uplink UL-A is transmitted to the radio apparatus controller 51A.

When the radio apparatus 52 receives the CPRI signal of the downlink DL-B transmitted from the radio apparatus controller 51B, the radio apparatus 52 determines whether or not the recovery clock generated from the received CPRI signal of the downlink DL-B is synchronous with the recovery clock generated from the CPRI signal of the downlink DL-A. If the radio apparatus 52 determines that they are in the asynchronous state, the radio apparatus 52 notifies the radio apparatus controller 51B of information which indicates the asynchronous state and is put in the CPRI signal of the uplink UL-B.

The radio apparatus controller 51B receives the CPRI signal of the uplink UL-B from the radio apparatus 52. When the information indicating the asynchronous state is included in the received CPRI signal of the uplink UL-B, the radio apparatus controller 51B synchronizes the operation clock of the radio apparatus controller 51B with the recovery clock generated from the received CPRI signal of the uplink UL-B.

In addition, while performing the process of synchronizing the operation clock with the recovery clock, the radio apparatus controller 51B suspends transmitting the CPRI signal of the downlink DL-B to the radio apparatus 52. When the operation clock is synchronized with the recovery clock, the radio apparatus controller 51B resumes transmitting the CPRI signal of the downlink DL-B to the radio apparatus 52.

According to the embodiments of the present invention, the operation clock of the radio apparatus controller 51B can be synchronized with the operation clock of the radio apparatus controller 51A without providing a circuit such as a process speed conversion unit for establishing a synchronization in the radio apparatus 52.

As a result, an error in data transfer such as a bit loss error etc., which is a factor of degrading the line quality and the throughput of the entire system, can be reduced.

In addition, while performing the process of synchronizing the operation clock of the radio apparatus controller 51B with the recovery clock generated from the CPRI signal of the uplink UL-B, the radio apparatus controller 51B does not transmit the CPRI signal of the downlink DL-B to the radio apparatus 52. Therefore, it is not necessary to provide a process speed conversion unit etc. for the radio apparatus 52 to process the CPRI signal of the downlink DL-B which is asynchronous with the CPRI signal of the downlink DL-A, thereby not increasing the circuit size of the radio apparatus 52 for establishment of synchronization.

Furthermore, the clock system in the radio apparatus 52 is not complicated for establishment of synchronization.

Described below is the method of radio apparatus 52 notifying the radio apparatus controller 51B that the operation clock of the radio apparatus controller 51B is asynchronous with the operation clock of the radio apparatus controller 51A.

As described above, according to the embodiment of the present invention, the radio apparatus 52 operates in synchronization with the recovery clock generated from the CPRI signal of the downlink DL-A received from the radio apparatus controller 51A. Therefore, if the radio apparatus 52 samples data when the received CPRI signal of the downlink DL-B from the radio apparatus controller 51B is asynchronous with the operation clock of the radio apparatus 52, there occurs an error by a bit loss. That is, if the bit rate of the CPRI data targeted for data sampling is X (bits/second) and the sampling speed in the radio apparatus is Y (bits/second), the bit loss error occurs at the probability of ERROR=|(X−Y)/Y|.

In the CPRI standard, the abnormality of data caused by the bit loss error is reported from the radio apparatus to the radio apparatus controller by the Loss Of Signal (LOS) information and the Loss Of Frame (LOF) information in the control word embedded in the hyperframe of the CPRI signal.

Figure 6:
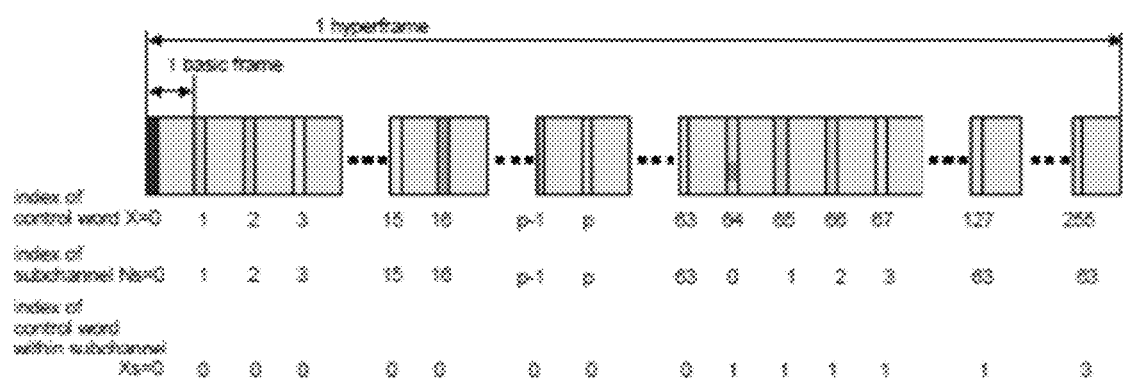
FIG. 6 illustrates a control word and a subchannel in a hyperframe of a CPRI signal.
Figure 7:
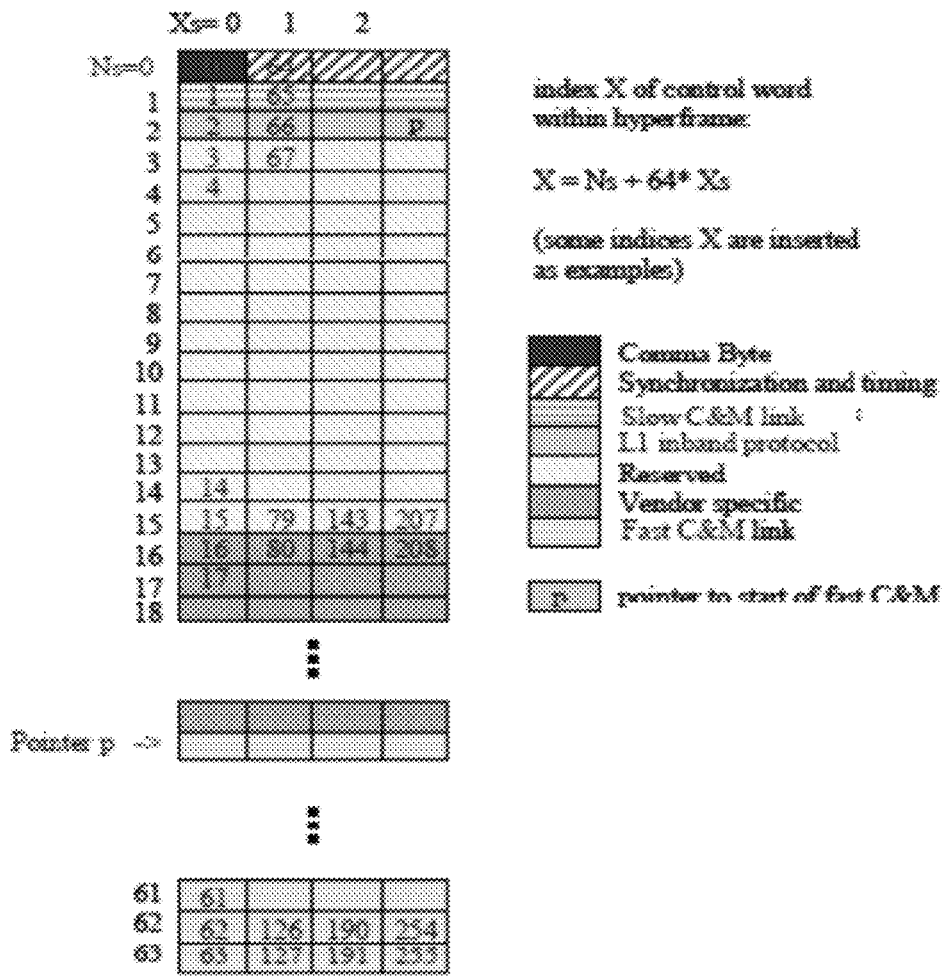
FIG. 7 illustrates a subchannel in a hyperframe.

FIG. 6 illustrates a control word and a sub-channel in the hyperframe of the CPRI signal. FIG. 7 illustrates a sub-channel in the hyperframe.

As illustrated in FIG. 6, one hyperframe of the CPRI signal includes 256 basic frames. The header of each basic frame includes a control word and IQ data after the control word.

The control word is mapped as illustrated in FIG. 7 for each hyperframe. In the control word illustrated in FIG. 7, the LOS information and the LOF information are included in the L1 inband protocol area. The comma byte in the control word in FIG. 7 is an area indicating the header of a hyperframe, and includes a comma code (for example, K28.5) which is a unique code.

As a method of the radio apparatus 52 notifying the radio apparatus controller 51B that the operation clock of the radio apparatus controller 51B is asynchronous with the operation clock of the radio apparatus controller 51A, the LOS information and the LOF information can be used. That is, using the LOS information and the LOF information in the CPRI signal of the uplink UL-B from the radio apparatus 52 to the radio apparatus controller 51B, the asynchronous state can be reported.

However, the loss of signal is detected when decode errors occur a specified or a larger number of times per hyperframe of the CPRI signal. For this reason, the LOS information indicating that decode errors have occurred is put in a hyperframe subsequent to the hyperframe in which decode errors have occurred the specified or the larger number of times. Therefore, at least the amount of information in two consecutive hyperframes is required for the radio apparatus 52 to detect a loss of signal and notify the radio apparatus controller 51B.

In addition, the loss of frame is output when a comma code (K28.5) in the hyperframe does not appear twice or more in the original hyperframe period. For this reason, the LOF information is put in the hyperframes two or frames later in time in the hyperframe period. Therefore, the amount of information in three consecutive hyperframes is required for the radio apparatus 52 to detect the loss of frame and notify the radio apparatus controller 51B of the detection.

Figure 8:
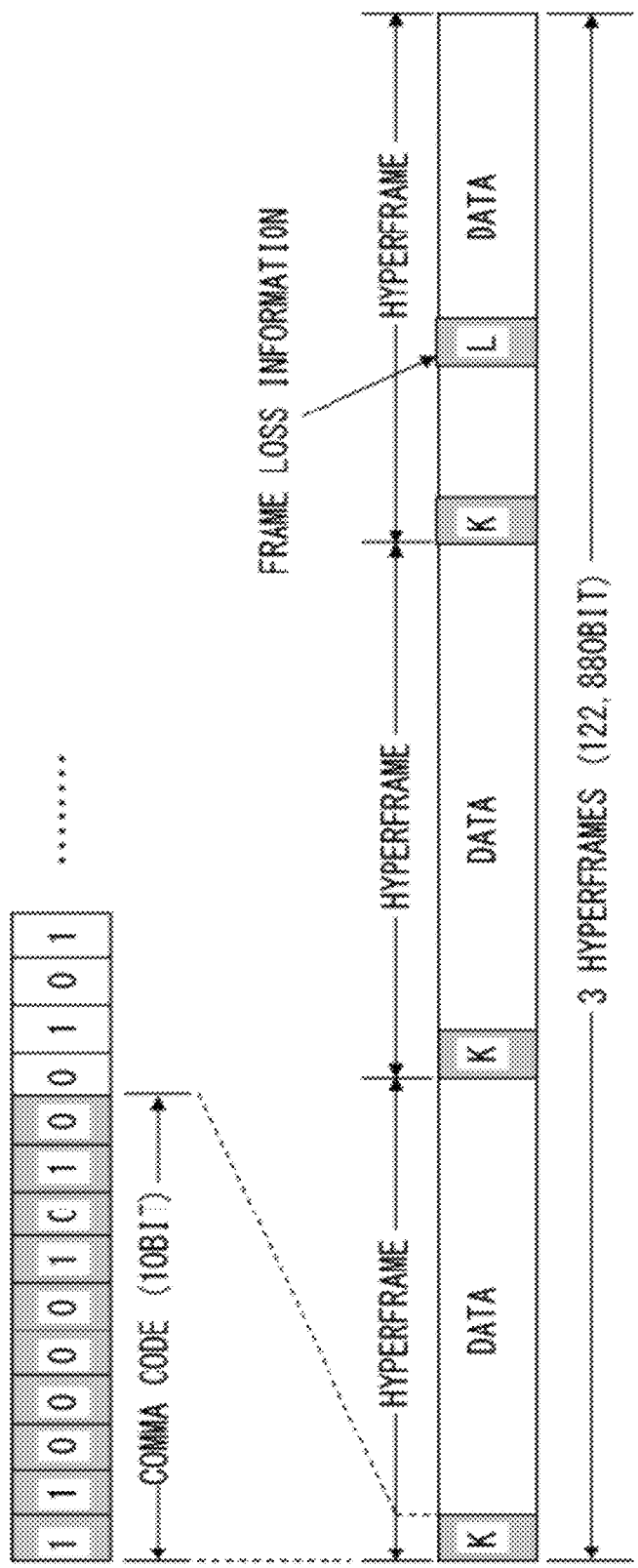
FIG. 8 is an explanatory view of a CPRI frame required to detect a bit loss error according to LOF information.

FIG. 8 is an explanatory view of a CPRI frame required to detect a bit loss error according to LOF information.

As illustrated in FIG. 8, the radio apparatus 52 detects that a decode error has occurred by obtaining two hyperframes of CPRI signals consecutively. Then, the radio apparatus 52 puts the LOF information in the third hyperframe in time series. The radio apparatus controller 51B detects that the operation clock of the radio apparatus controller 51B is asynchronous with the operation clock of the radio apparatus controller 51A, according to the LOF information in the hyperframe of the CPRI signal received from the radio apparatus 52. Thus, at least the amount of information in the three consecutive hyperframes is required for the radio apparatus 52 to detect the loss of frame and notify the radio apparatus controller 51B of the loss.

The amount of information in the three hyperframes of the CPRI signal corresponds to 122,880 bits. That is, one basic frame is 128 bits (8 bits×16 bytes), and one hyperframe is 32,768 bits (128×256 basic frames). Then, since one hyperframe in the CPRI connection after the conversion from 8 bits to 10 bits by 8b/10b code is 40,960 bits (32,768 8×10 bits), 3 hyperframes are 122,880 bits.

Therefore, at least the data of 122,880 consecutive bits are required for the radio apparatus 52 to detect the loss of frame and notify the radio apparatus controller 51B of the LOF information. Thus, it is necessary for the value of the bit loss error to be ERROR=$1/122,800$ or less.

Therefore, when there is a large frequency deviation between the operation clock of the radio apparatus controller 51A and the operation clock of the radio apparatus controller 51B, that is, when the value of the bit loss error exceeds $1/122,800$, the radio apparatus 52 cannot notify the radio apparatus controller 51B that the radio apparatus controller 51B is in the asynchronous state using the LOF information in the hyperframe of the CPRI signal.

As described above, the amount of information consecutive in hyperframe units is required for the radio apparatus 52 to notify the radio apparatus controller of the asynchronous state using the LOS information and the LOF information in the hyperframe of the CPRI signal. When there is a large frequency deviation between the operation clock of the radio apparatus controller 51A and the operation clock of the radio apparatus controller 51B, the value of the bit loss error is large. Therefore, the radio apparatus 52 cannot notify the radio apparatus controller of the asynchronous state using the LOS information and the LOF information in the hyperframe of the CPRI signal.

Then, according to the embodiments of the present invention, a method of the radio apparatus 52 notifying the radio apparatus controller 51B of the asynchronous state of the operation clock of the radio apparatus controller 51B can be realized by inserting different comma codes (K codes) between the case in the synchronous state and the case in the asynchronous state into the comma byte indicating the header of the hyperframe of the CPRI signal.

That is, when the operation clock of the radio apparatus controller 51B is in the synchronous state, the radio apparatus 52 selects a comma code (for example, K28.5) indicating the synchronous state as a comma code indicating the header of the hyperframe of the CPRI signal to be transmitted to the radio apparatus controller 51B.

In addition, when the operation clock of the radio apparatus controller 51B is in the asynchronous state, the radio apparatus 52 selects a comma code (for example, K28.6) indicating the asynchronous state as a comma code indicating the header of the hyperframe of the CPRI signal to be transmitted to the radio apparatus controller 51B.

The radio apparatus controller 51B can determine whether or not the radio apparatus controller 51B is in a synchronous state by detecting a comma code indicating the synchronous state or a comma code indicating the asynchronous state.

The comma code included in the comma byte of the hyperframe of the CPRI signal is a unique bit string of 10 bits which is distinguished from the code (D code) assigned for data. Therefore, if the value of the bit loss error (ERROR) is $1/10$ or less, the radio apparatus controller 51B can detect from the CPRI signal received from the radio apparatus 52 as to whether or not the operation clock of the radio apparatus controller 51B is in the synchronous state. That is, even when the frequency deviation between the operation clock of the radio apparatus controller 51A and the operation clock of the radio apparatus controller 51B is somewhat large, the radio apparatus controller 51B can detect from the CPRI signal received from the radio apparatus 52 that the radio apparatus controller 51B is in the asynchronous state unless the value of the bit loss error (ERROR) in the radio apparatus controller 51B exceeds $1/10$.

The embodiment of the present invention is further described below with reference to FIG. 9 in addition to FIG. 5.

FIG. 9 is the schematic illustration of a signal of an uplink line and a signal of a downlink line in the configuration in which a plurality of radio communication systems coexist according to an embodiment of the present invention.

In FIG. 9($a$), when the radio apparatus 52 receives the CPRI signal of the downlink DL-A from the radio apparatus controller 51A, the radio apparatus 52 establishes the synchronization between the recovery clock generated from the received CPRI signal of the downlink DL-A and the operation clock of the radio apparatus 52. Then, the radio apparatus 52 transmits the CPRI signal of the uplink UL-A to the radio apparatus controller 51A, and simultaneously transmits the CPRI signal of the uplink UL-B to the radio apparatus controller 51B. In addition, when the recovery clock generated from the CPRI signal of the downlink DL-B received from the radio apparatus controller 51B is asynchronous with the recovery clock generated from the CPRI signal of the downlink DL-A, the radio apparatus 52 selects the comma code (for example, K28.6) indicating the asynchronous state as a comma code indicating the header of the hyperframe of the CPRI signal of the uplink UL-B. Then, the radio apparatus 52 transmits to the radio apparatus controller 51B the CPRI signal of the uplink UL-B which includes the comma code indicating the asynchronous state.

In FIG. 9($b$), when the radio apparatus controller 51B receives from the radio apparatus 52 the CPRI signal of the uplink UL-B which includes the comma code indicating the asynchronous state, the radio apparatus controller 51B suspends transmitting the CPRI signal of the downlink DL-B to the radio apparatus 52. Then, the radio apparatus controller 51B performs the process of synchronizing the operation clock of the radio apparatus controller 51B with the recovery clock generated from the CPRI signal of the uplink UL-B.

In FIG. 9($c$), the radio apparatus controller 51B resumes transmitting the CPRI signal of the downlink DL-B to the radio apparatus 52 after the establishment of synchronization. The radio apparatus 52 determines whether or not the recovery clock generated from the received CPRI signal of the downlink DL-B is synchronous with the recovery clock generated from the CPRI signal of the downlink DL-A. If the radio apparatus 52 determines that they are in the synchronous state, the radio apparatus 52 selects the comma code (for example, K28.5) indicating the synchronous state as a comma code indicating the header of the hyperframe of the CPRI signal of the uplink UL-B. The radio apparatus 52 transmits to the radio apparatus controller 51B the CPRI signal of the uplink UL-B which includes the comma code indicating the synchronous state.

The embodiment of the present invention is further described below with reference to the configuration of the radio apparatus controller and the radio apparatus according to the embodiment of the present invention.

Figure 10:
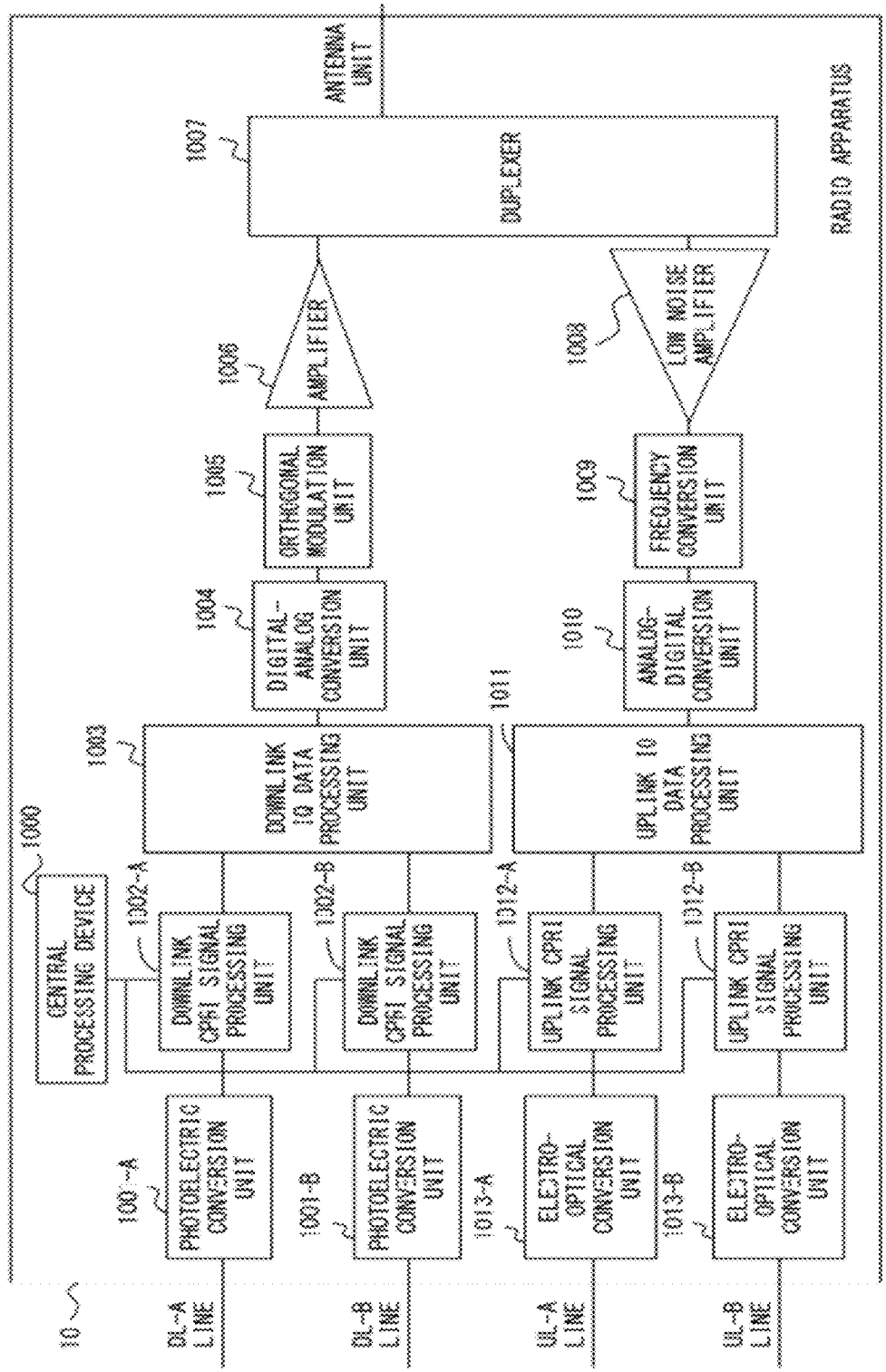
FIG. 10 illustrates a configuration of the radio apparatus according to an embodiment of the present invention.

FIG. 10 illustrates a configuration of the radio apparatus according to the embodiment of the present invention.

The DL-A line illustrated in FIG. 10 corresponds to the CPRI line of the downlink DL-A from the radio apparatus controller 51A to the radio apparatus 52 illustrated in FIG. 5. The UL-A line illustrated in FIG. 10 corresponds to the CPRI line of the uplink UL-A from the radio apparatus 52 to the radio apparatus controller 51A.

In addition, the DL-B line illustrated in FIG. 10 corresponds to the CPRI line of the downlink DL-B from the radio apparatus controller 51B to the radio apparatus 52 illustrated in FIG. 5. The UL-B line illustrated in FIG. 10 corresponds to the CPRI line of the uplink UL-B from the radio apparatus 52 to the radio apparatus controller 51B.

A radio apparatus 10 includes a central processing device 1000, photoelectric conversion units 1001-A and 1001-B, downlink CPRI signal processing units 1002-A and 1002-B, a downlink IQ data processing unit 1003, a digital-analog conversion unit 1004, an orthogonal modulation unit 1005, an amplifier 1006, and a duplexer 1007. Furthermore, the radio apparatus 10 includes a low noise amplifier 1008, a frequency conversion unit 1009, an analog-digital conversion unit 1010, an uplink IQ data processing unit 1011, uplink CPRI signal processing units 1012-A and 1012-B, and electro-optical conversion units 1013-A and 1013-B.

The photoelectric conversion unit 1001-A converts the optical signal output from the CPRI line of the downlink DL-A into an electric signal, and outputs the converted signal to the downlink CPRI signal processing unit 1002-A. The photoelectric conversion unit 1001-B converts the optical signal output from the CPRI line of the downlink DL-B into an electric signal, and outputs the converted signal to the downlink CPRI signal processing unit 1002-B.

The downlink CPRI signal processing unit 1002-A extracts the CPRI frame from the CPRI signal which has been converted into an electric signal, and extracts from the extracted CPRI frame the control data and the In-phase Quadrature (IQ) data including user data. The extracted control data is output to the central processing device 1000, and the extracted IQ data is output to the downlink IQ data processing unit 1003. The downlink CPRI signal processing unit 1002-B extracts the CPRI frame from the CPRI signal which has been converted into an electric signal, and extracts the control data and IQ data from the extracted CPRI frame. The extracted control data is output to the central processing device 1000, and the extracted IQ data is output to the downlink IQ data processing unit 1003.

The downlink IQ data processing unit 1003 filters and combines the IQ data output from the downlink CPRI signal processing units 1002-1 and 1002-2, and converts the data into IQ data for transmission.

The digital-analog conversion unit 1004 converts the IQ data for transmission, which has been output from the downlink IQ data processing unit 1003, from a digital signal to an analog signal.

The orthogonal modulation unit 1005 modulates the IQ data as an analog signal which has been output from the digital-analog conversion unit 1004, and puts the data on a carrier frequency.

The amplifier 1006 amplifies the carrier with the IQ data signal to a specified transmission power.

The duplexer 1007 separates the transmission signal input to the antenna unit from the received signal output from the antenna unit to share the antenna unit between the transmission system and the reception system.

The low noise amplifier 1008 amplifies the received analog signal which has been input from the antenna unit through the duplexer 1007.

The frequency conversion unit 1009 frequency-converts the received analog signal amplified by the low noise amplifier 1008 into a frequency which is low enough for processing by the analog-digital conversion unit 1010.

The analog-digital conversion unit 1010 converts the received analog signal, which has been frequency-converted and sampled, into a digital signal.

The uplink IQ data processing unit 1011 extracts the IQ baseband data from the received signal which has been converted into a digital signal.

The uplink CPRI signal processing unit 1012-A puts in the CPRI format the IQ baseband data output from the uplink IQ data processing unit 1011 and the control data output from the central processing device 1000. The uplink CPRI signal processing unit 1012-B puts in the CPRI format the IQ baseband data output from the uplink IQ data processing unit 1011 and the control data output from the central processing device 1000.

The electro-optical conversion unit 1013-A converts the CPRI signal output from the uplink CPRI signal processing unit 1012-A into an optical signal, and outputs the converted signal to the CPRI line of the uplink UL-A. The electro-optical conversion unit 1013-B converts the CPRI signal output from the uplink CPRI signal processing unit 1012-B into an optical signal, and outputs the converted signal to the CPRI line of the uplink UL-B.

Figure 11:
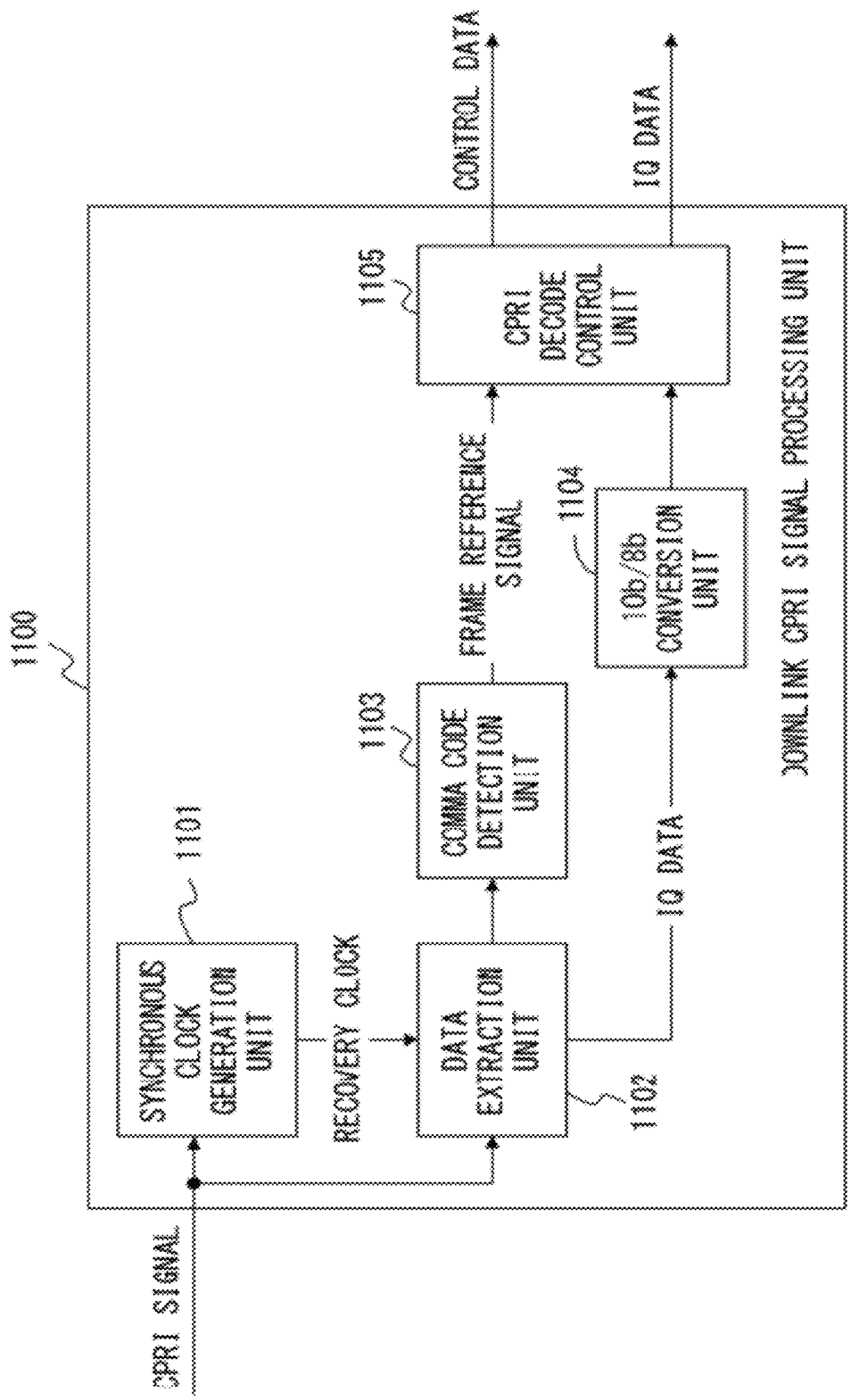
FIG. 11 illustrates a configuration of a downlink CPRI signal processing unit of the radio apparatus according to an embodiment of the present invention.

FIG. 11 illustrates a configuration of the downlink CPRI signal processing unit of the radio apparatus according to the embodiment of the present invention.

A downlink CPRI signal processing unit 1100 illustrated in FIG. 11 corresponds to the downlink CPRI signal processing units 1002-A and 1002-B illustrated in FIG. 10.

The synchronous clock generation unit 1101 extracts the clock component superposed on the downlink CPRI signal, and generates a recovery clock as an operation clock of the radio apparatus.

The data extraction unit 1102 extracts a CPRI data signal from the downlink CPRI signal according to the recovery clock generated by the synchronous clock generation unit 1101.

A comma code detection unit 1103 detects a 10-bit comma code (for example, K28.5) indicating the header of the CPRI frame from the CPRI data signal extracted by the data extraction unit 1102. Then, the comma code detection unit 1103 generates a frame reference signal based on the detected comma code.

A 10b/8b conversion unit 1104 converts the 10-bit CPRI data signal extracted by the data extraction unit 1102 into an 8-bit CPRI data signal.

A CPRI decode unit 1105 extracts control data and IQ data from the 8-bit CPRI data signal according to the frame reference signal generated by the comma code detection unit.

Figure 12:
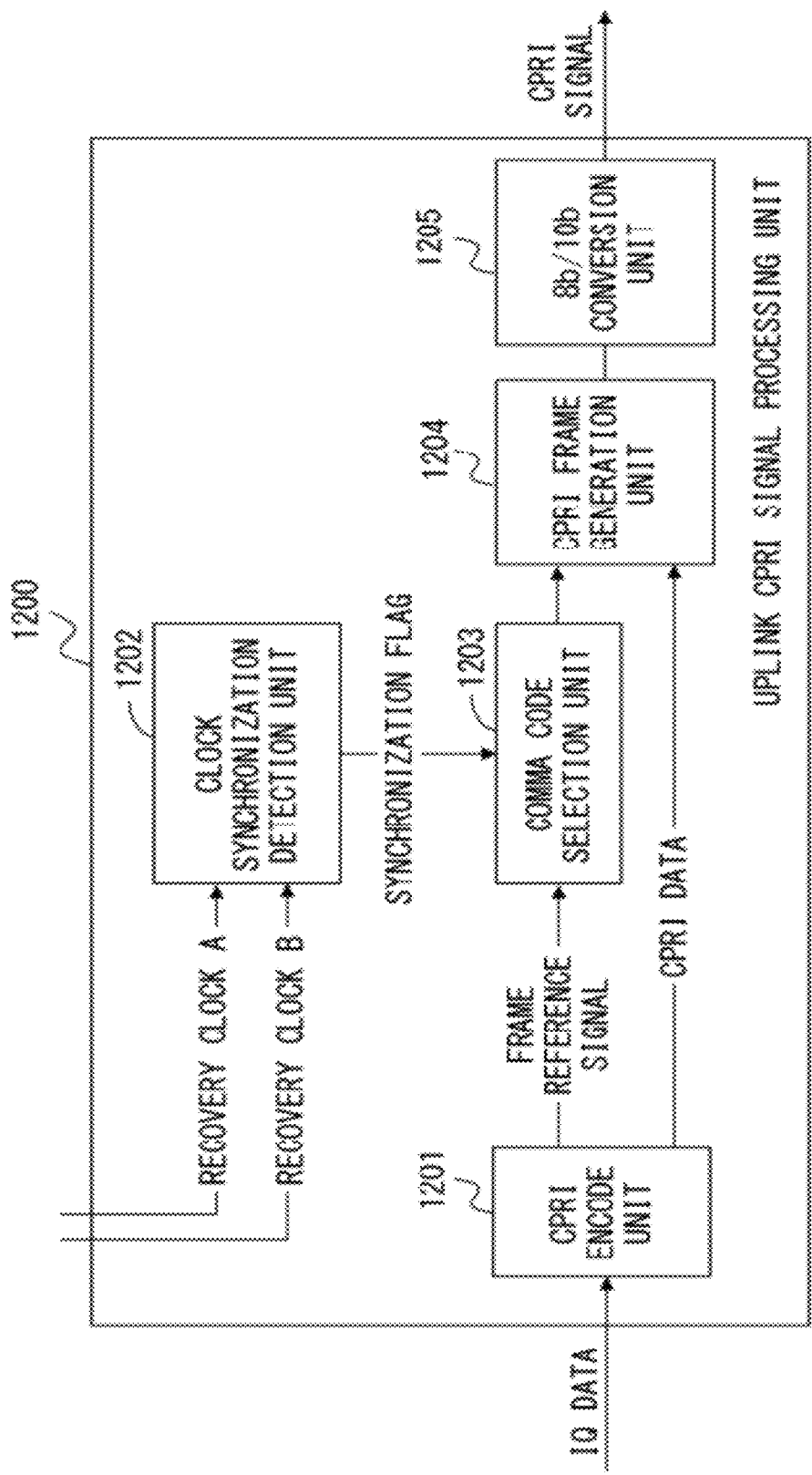
FIG. 12 illustrates a configuration of an uplink CPRI signal processing unit of the radio apparatus according to an embodiment of the present invention.

FIG. 12 illustrates a configuration of the uplink CPRI signal processing unit of the radio apparatus according to the embodiment of the present invention.

An uplink CPRI signal processing unit 1200 illustrated in FIG. 12 corresponds to the uplink CPRI signal processing unit 1012-B illustrated in FIG. 10.

A CPRI encode unit 1201 encodes the IQ data from the uplink IQ data processing unit 1011 into CPRI data.

A clock synchronization detection unit 1202 compares the recovery clock B generated by the synchronous clock generation unit 1101 of the downlink CPRI signal processing unit 1002-B with the recovery clock A generated by the synchronous clock generation unit 1101 of the downlink CPRI signal processing unit 1002-A, and determines whether or not the recovery clock A and the recovery clock B are synchronous with each other. Then, the clock synchronization detection unit 1202 transmits the synchronization flag indicating the determination result to a comma code selection unit 1203.

The comma code selection unit 1203 selects and outputs a comma code (for example, K28.5) indicating the synchronous state or a comma code (for example, K28.6) indicating the asynchronous state as a comma code indicating the header of the hyperframe of the CPRI signal based on the synchronization flag received from the clock synchronization detection unit 1202.

A CPRI frame generation unit 1204 puts the CPRI data output from the CPRI encode unit 1201 and the comma code output from the comma code selection unit 1203 in the CPRI format, thereby generating a CPRI signal.

An 8b/10b conversion unit 1205 converts the 8-bit CPRI signal output from the CPRI frame generation unit 1204 into a 10-bit CPRI signal, and outputs the resultant signal.

The configuration example and the operation of the clock synchronization detection unit 1202 of the uplink CPRI signal processing unit illustrated in FIG. 12 are described below with reference to FIG. 13 through FIG. 15.

Figure 13:
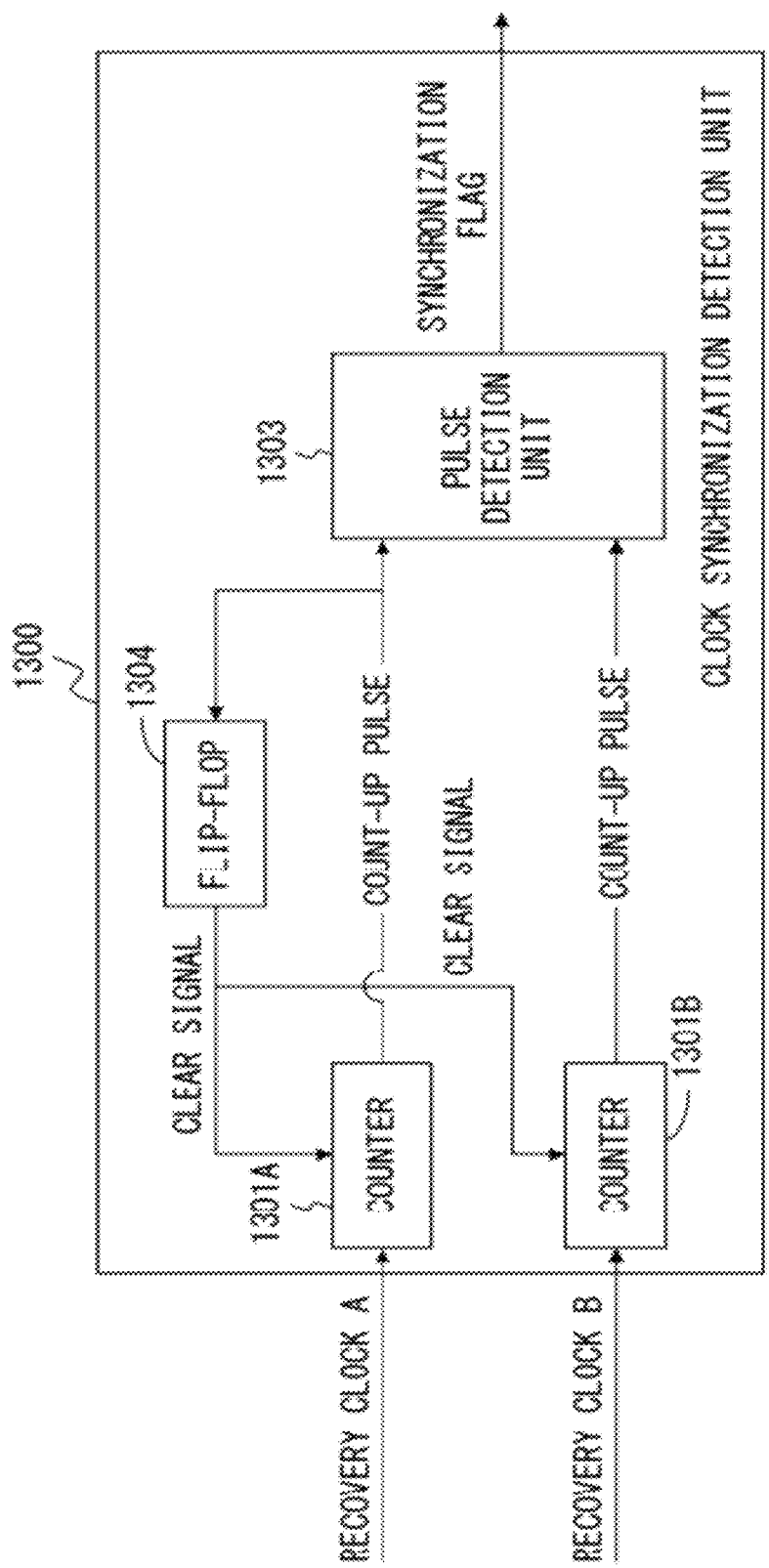
FIG. 13 illustrates an example of a configuration of a clock synchronization detection unit of the uplink CPRI signal processing unit illustrated in FIG. 12.

FIG. 13 illustrates an example of a configuration of the clock synchronization detection unit of the uplink CPRI signal processing unit illustrated in FIG. 12. A clock synchronization detection unit 1300 illustrated in FIG. 13 corresponds to the clock synchronization detection unit 1202 illustrated in FIG. 12.

The counters 1301A and 1301B simultaneously start counting up clock pulses a specified number of times using the recovery clock A and the recovery clock B as input signals, respectively.

That is, the counter 1301A counts up the clock pulses a specified number of times using the recovery clock A generated by the synchronous clock generation unit 1101 of the downlink CPRI signal processing unit 1002-A as an input signal. In addition, the counter 1301B counts up the clock pulses a specified number of times using the recovery clock B generated by the synchronous clock generation unit 1101 of the downlink CPRI signal processing unit 1002-B as an input signal.

The counter 1301A outputs the count-up pulse to a pulse detection unit 1303 promptly after the completion of the count-up of the clock pulses a specified number of times. In addition, the counter 1301B outputs the count-up pulse to the pulse detection unit 1303 promptly after the completion of the count-up of the clock pulses a specified number of times.

The pulse detection unit 1303 compares the time position of the count-up pulse output from the counter 1301A with the time position of the count-up pulse output from the counter 1301B, thereby detecting whether or not the recovery clock A and the recovery clock B are synchronous with each other.

Figure 14:
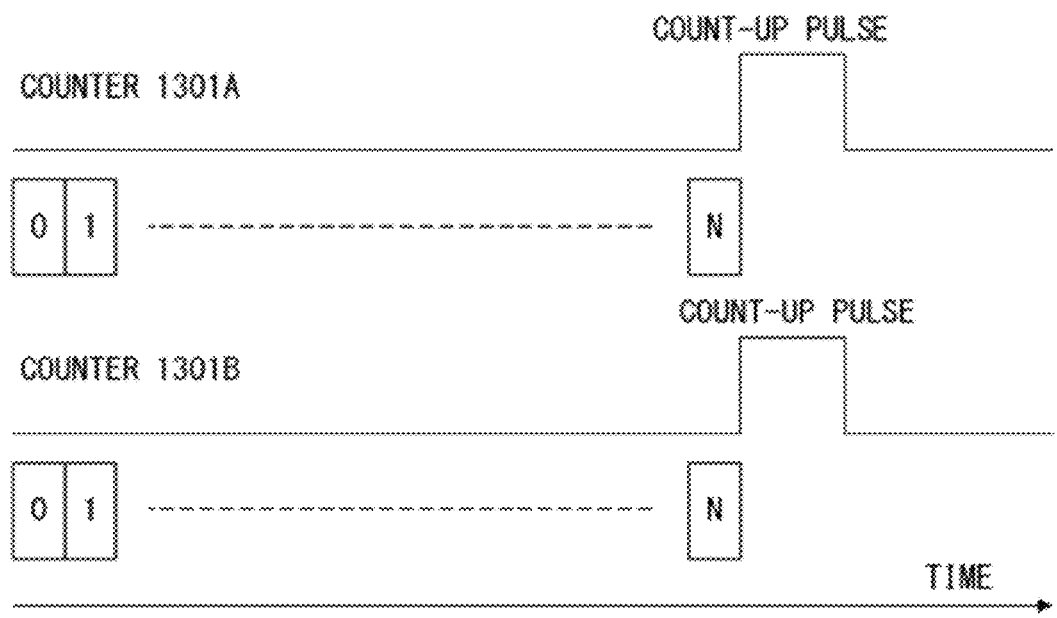
FIG. 14 is an explanatory view of a time position relationship between count-up pulses when two recovery clocks are synchronized.

FIG. 14 is an explanatory view of a time position relationship between count-up pulses when two recovery clocks are synchronized. FIG. 15 is an explanatory view of a time position relationship between count-up pulses when two recovery clocks are not synchronized.

Figure 15:
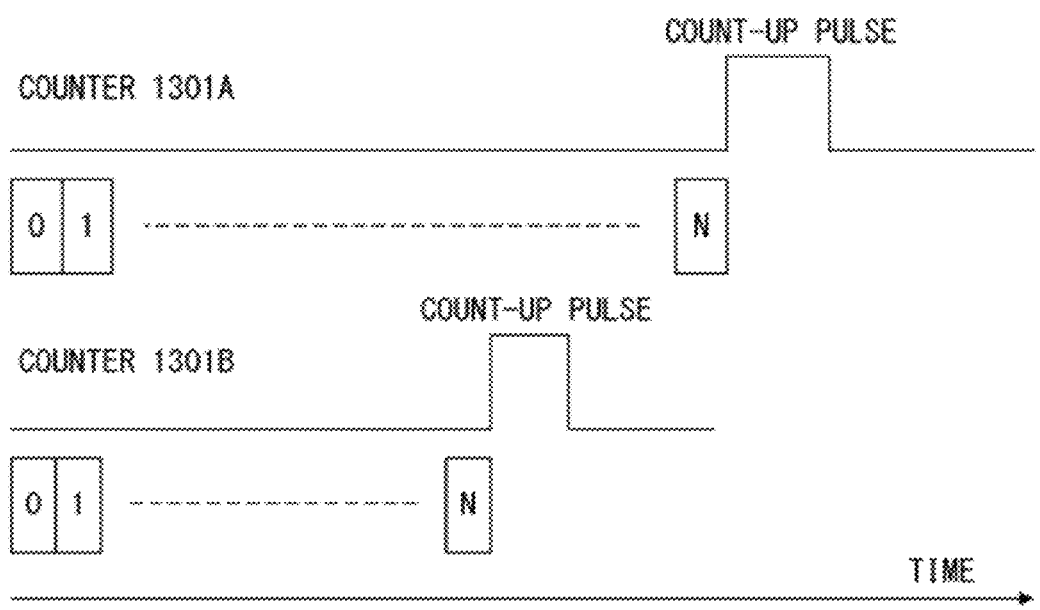
FIG. 15 is an explanatory view of a time position relationship between count-up pulses when two recovery clocks are not synchronized.

FIG. 14 and FIG. 15 illustrate examples of the cases in which the counters 1301A and 1301B count up the clock pulses N times as the specified number of times.

As illustrated in FIG. 14, when the recovery clock A and the recovery clock B are is synchronous with each other, the count-up pulse output from the counter 1301A matches in time position the count-up pulse output from the counter 1301B. Therefore, the pulse detection unit 1303 detects that the time positions of the two count-up pulses match.

As illustrated in FIG. 15, when the recovery clock A and the recovery clock B are asynchronous, the count-up pulse output from the counter 1301A is different in time position from the count-up pulse output from the counter 1301B. Therefore, the pulse detection unit 1303 detects that the time positions of the two count-up pulses are different.

When the pulse detection unit 1303 detects that the count-up pulse output from the counter 1301A matches in time position the count-up pulse output from the counter 1301B, the pulse detection unit 1303 outputs a synchronization flag indicating that the recovery clock A and the recovery clock B are in the synchronous state.

On the other hand, when the pulse detection unit 1303 detects that the count-up pulse output from the counter 1301A is different in time position from the count-up pulse output from the counter 1301B, the pulse detection unit 1303 outputs a synchronization flag indicating that the recovery clock A and the recovery clock B are in the asynchronous state.

When the count-up pulse is output from the counter 1301A, a flip-flop 1304 outputs a reset signal for reset of the counter values of the counters 1301A and 1301B to the counter 1301A.

Next, the radio apparatus controller for establishment of synchronization between the recovery clock generated according to the downlink signal received from the radio apparatus and the operation clock of the radio apparatus controller according to the embodiment of the present invention is described below.

Figure 16:
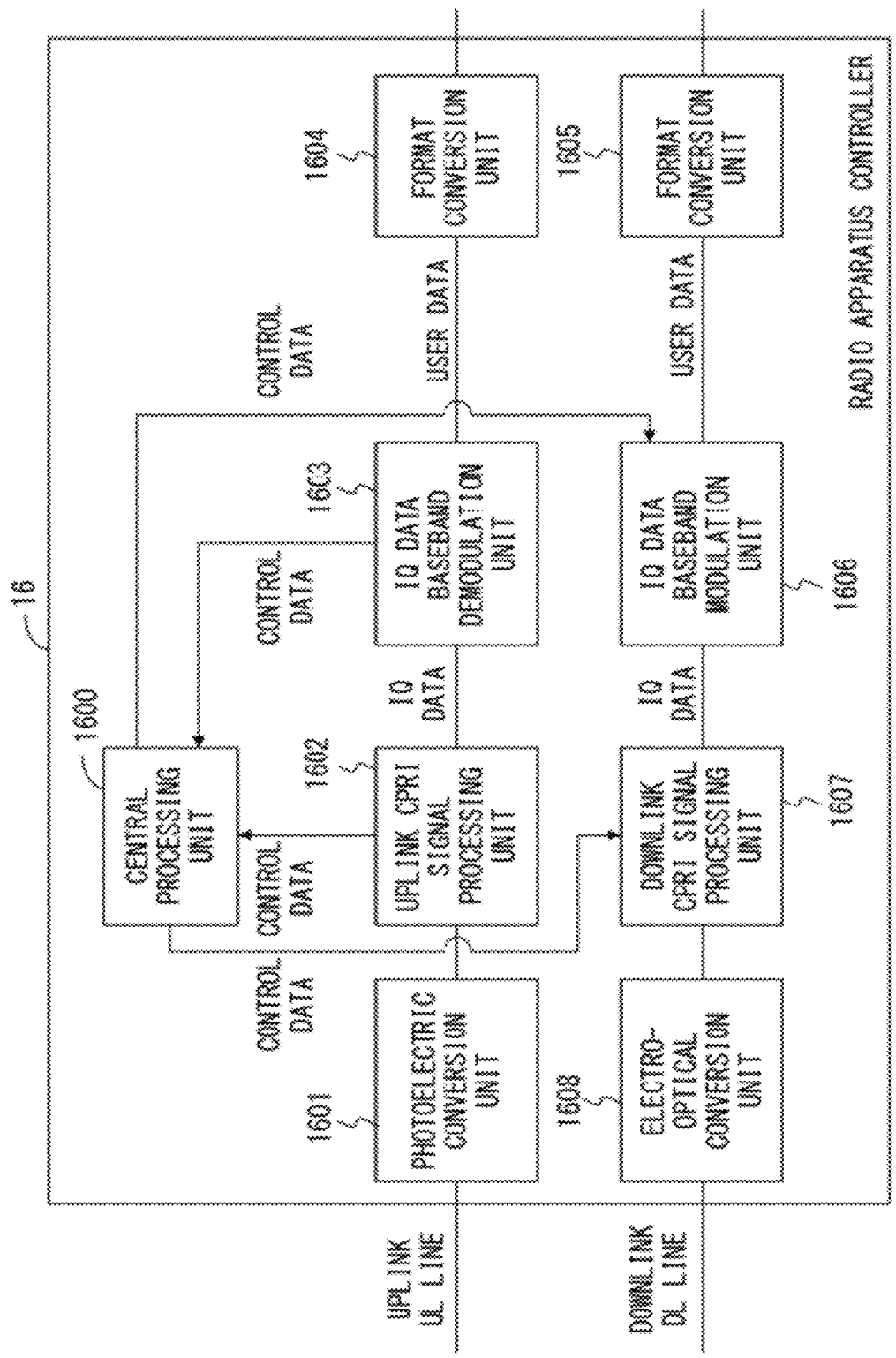
FIG. 16 illustrates an example of the configuration of the radio apparatus controller according to an embodiment of the present invention.

FIG. 16 illustrates an example of a configuration of the radio apparatus controller according to the embodiment of the present invention.

A radio apparatus controller 16 illustrated in FIG. 16 corresponds to, for example, the radio apparatus controller 51B illustrated in FIG. 5.

In addition, the uplink UL line illustrated in FIG. 16 corresponds to the CPRI line of the uplink UL-B from the radio apparatus 52 to the radio apparatus controller 51B. the downlink DL line illustrated in FIG. 16 corresponds to the CPRI line of the downlink DL-B from the radio apparatus controller 51B to the radio apparatus 52.

The radio apparatus controller 16 illustrated in FIG. 16 includes a central processing device 1600, a photoelectric conversion unit 1601, an uplink CPRI signal processing unit 1602, an IQ data baseband demodulation unit 1603, and a format conversion unit 1604. Furthermore, the radio apparatus controller 16 includes a format conversion unit 1605, an IQ data baseband modulation unit 1606, a downlink CPRI signal processing unit 1607, and an electro-optical conversion unit 1608.

The photoelectric conversion unit 1601 converts the CPRI signal output from the uplink UL line as an optical signal into a CPRI signal as an electric signal.

The uplink CPRI signal processing unit 1602 extracts a CPRI frame from the CPRI signal which has been converted into an electric signal, and extracts control data and IQ data including user data from the extracted CPRI frame. The extracted control data is output to the central processing device 1600, and the extracted IQ data is output to the IQ data baseband demodulation unit 1603.

The IQ data baseband demodulation unit 1603 demodulates the IQ data output from the uplink CPRI signal processing unit 1602, and extracts user data and control data. The extracted user data is output to the format conversion unit 1605, and the extracted control data is output to the central processing device 1600.

The format conversion unit 1604 converts the user data into a format for transmission to an upper apparatus such as an exchange station etc., and transmits the converted user data to the upper apparatus.

The format conversion unit 1605 converts the format of the data signal received from the upper apparatus, and extracts user data from the data signal.

The IQ data baseband modulation unit 1606 combines the user data output from the format conversion unit with the control data output from the central processing device 1600, and modulates the resultant data as IQ data.

The downlink CPRI signal processing unit 1607 converts the modulated IQ data and the control data output from the central processing device 1600 into a CPRI format.

The electro-optical conversion unit 1608 converts the CPRI signal, as an electric signal, which has been converted into the CPRI format, into an optical signal, and outputs the signal to the downlink DL line.

Figure 17:
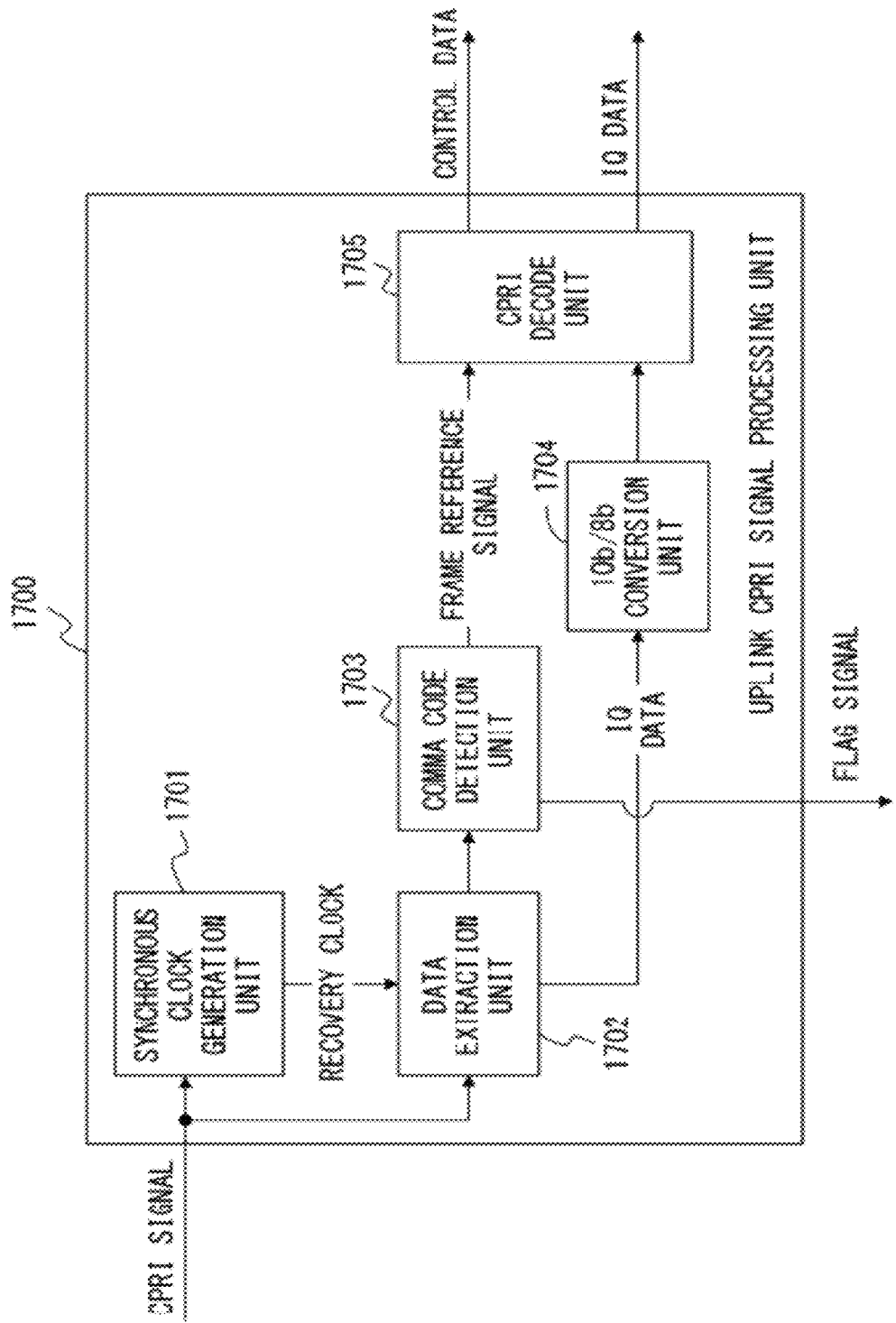
FIG. 17 illustrates an example of the configuration of the uplink CPRI signal processing unit of the radio apparatus controller for establishment of the synchronization between the recovery clock generated from an uplink signal and the operation clock of the apparatus.

FIG. 17 illustrates an example of a configuration of the uplink CPRI signal processing unit of the radio apparatus controller for establishment of synchronization between the recovery clock generated from an uplink signal and the operation clock of the radio apparatus controller.

An uplink CPRI signal processing unit 1700 illustrated in FIG. 17 corresponds to the uplink CPRI signal processing unit 1602 illustrated in FIG. 16.

Asynchronous clock generation unit 1701 extracts the clock component superposed on the uplink CPRI signal, and generates a recovery clock as an operation clock of the radio apparatus controller.

The data extraction unit 1702 extracts a CPRI data signal from the uplink CPRI signal according to the recovery clock generated by the synchronous clock generation unit 1701.

The comma code detection unit 1703 detects a 10-bit comma code (for example, K28.5, K28.6) indicating the header of the CPRI frame from the CPRI data signal extracted by the data extraction unit 1702. Then, the comma code detection unit 1703 generates a frame reference signal based on the detected comma code, and output the generated frame reference signal to a CPRI decode unit 1705.

In addition, the comma code detection unit 1703 outputs a flag signal indicating a synchronous state or an asynchronous state to the downlink CPRI signal processing unit 1607 depending on whether the detected comma code is a comma code indicating a synchronous state (for example, K28.5) or a comma code indicating an asynchronous state (for example, K28.6).

A 10b/8b conversion unit 1704 converts the 10-bit CPRI data signal extracted by the data extraction unit 1702 into an 8-bit CPRI data signal.

The CPRI decode unit 1705 extracts control data and IQ data from the 8-bit CPRI data signal according to the frame reference signal generated by the comma code detection unit 1703.

Figure 18:
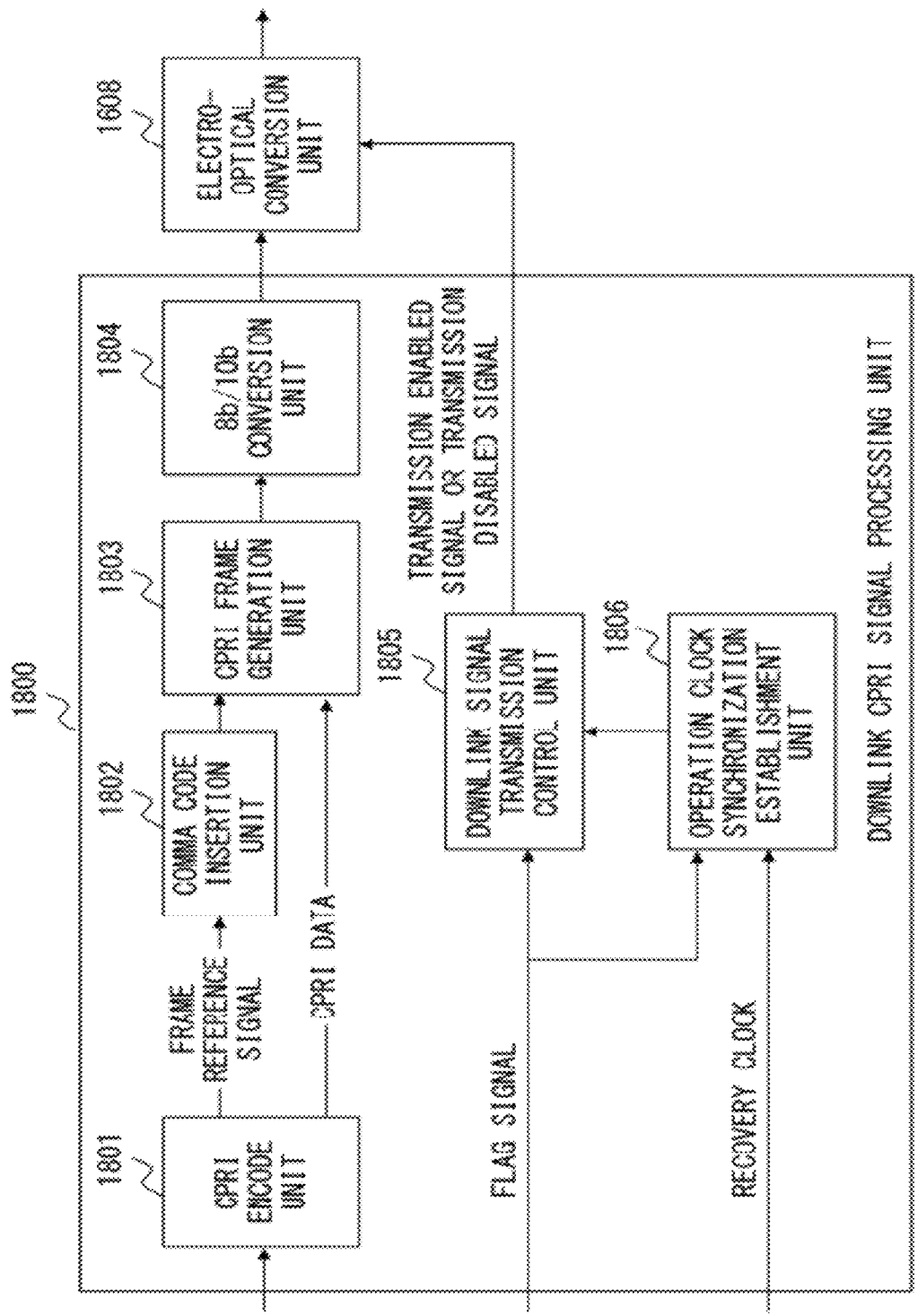
FIG. 18 illustrates an example of the configuration of the downlink CPRI signal processing unit of the radio apparatus controller for establishment of the synchronization between the recovery clock generated from an uplink signal and the operation clock of the radio apparatus controller.

FIG. 18 illustrates an example of a configuration of the downlink CPRI signal processing unit of the radio apparatus controller for establishment of synchronization between the recovery clock generated from an uplink signal and the operation clock of the radio apparatus controller.

A downlink CPRI signal processing unit 1800 illustrated in FIG. 18 corresponds to the downlink CPRI signal processing unit 1607 illustrated in FIG. 16.

A CPRI encode unit 1801 encodes the IQ data output from the IQ data baseband modulation unit 1606 into CPRI data. Then, the CPRI encode unit 1801 outputs the encoded CPRI data to a CPRI frame generation unit 1803, and outputs a frame reference signal for putting the CPRI data in a frame to a comma code insertion unit 1802.

The comma code insertion unit 1802 outputs a comma code indicating the header of the hyperframe of the CPRI signal (for example, K28.5) to the CPRI frame generation unit 1803 according to the frame reference signal.

The CPRI frame generation unit 1803 sets the CPRI data output from the CPRI encode unit 1801 and the comma code output from the comma code insertion unit 1802 in the CPRI format, thereby generating a CPRI signal.

An 8b/10b conversion unit 1804 converts the 8-bit CPRI signal output from the CPRI frame generation unit 1803 into a 10-bit CPRI signal, and outputs the resultant signal.

A downlink signal transmission control unit 1805 receives a flag signal output from the comma code detection unit 1703 of the uplink CPRI signal processing unit.

When the received flag signal is a flag indicating the synchronous state, the downlink signal transmission control unit 1805 outputs to the electro-optical conversion unit 1608 a transmission enabled signal for permission to transmit a CPRI signal to the downlink line.

In addition, when the received flag signal indicates the asynchronous state, the downlink signal transmission control unit 1805 outputs to the electro-optical conversion unit 1608 a transmission disabled signal for suspending transmission of the CPRI signal to the downlink line. Then, upon receipt of a synchronization completion signal from the operation clock synchronization establishment unit 1806, the downlink signal transmission control unit 1805 outputs the transmission enabled signal to the electro-optical conversion unit 1608.

The operation clock synchronization establishment unit 1806 receives the flag signal output from the comma code detection unit 1703 of the uplink CPRI signal processing unit. When the received flag signal indicates the asynchronous state, the operation clock synchronization establishment unit 1806 performs the process to synchronize the operation clock in the radio apparatus controller with the recovery clock received from the synchronous clock generation unit 1701 of the uplink CPRI signal processing unit.

Figure 19:
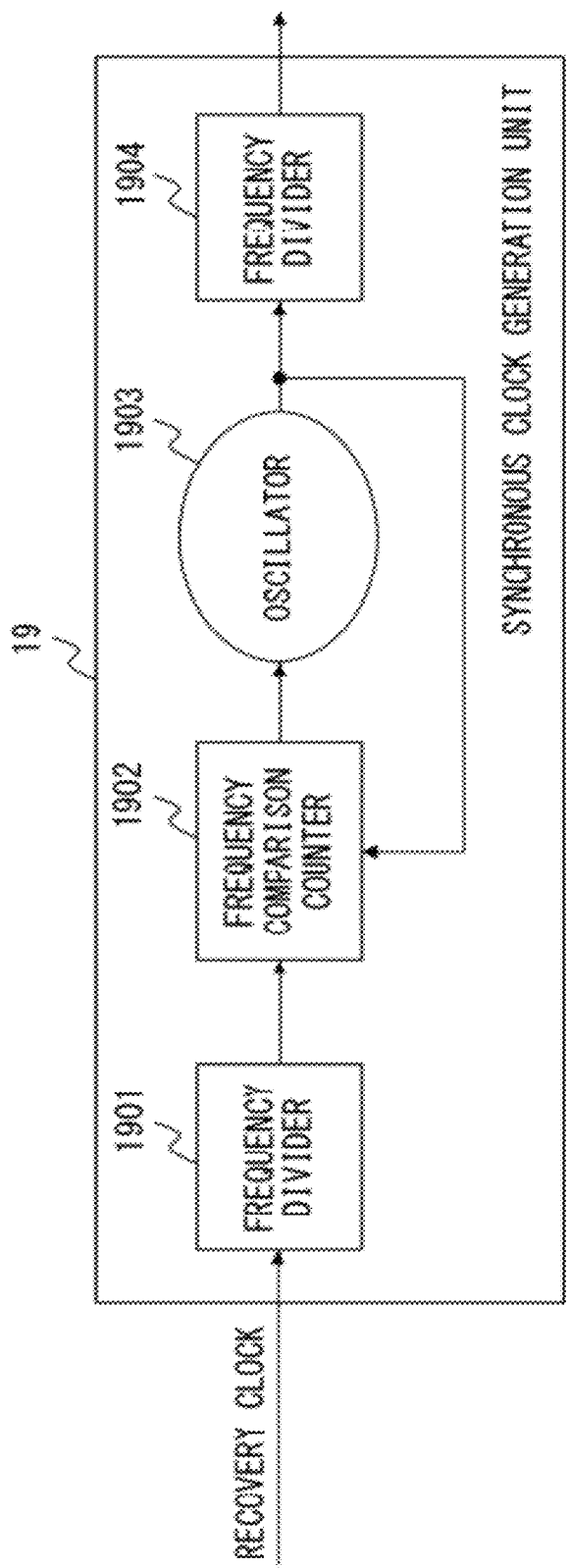
FIG. 19 illustrates an example of the configuration of the synchronous clock generation unit included in the operation clock synchronization establishment unit according to an embodiment of the present invention.

FIG. 19 illustrates an example of a configuration of the synchronous clock generation unit included in the operation clock synchronization establishment unit according to the embodiment of the present invention.

A frequency divider 1901 divides the recovery clock output from the synchronous clock generation unit 1701 of the uplink CPRI signal processing unit, and outputs a one-second reference signal.

A frequency comparison counter 1902 compares the count value of the oscillatory frequency of an oscillator 1903 with the one-second reference signal, and controls the control voltage of the oscillator 1903.

The frequency divider 1904 divides the frequency of the oscillator 1903 after the control by the frequency comparison counter 1902, and generates the operation clock of the radio apparatus controller.

Although not illustrated in FIG. 19, when the radio apparatus controller 51B is provided with a reference clock receiver, a synchronous clock generation unit 19 can select the one-second reference signal of the recovery clock generated from the reference clock receiver instead of the one-second reference signal of the recovery clock output from the synchronous clock generation unit 1701, and input the selected signal to the frequency comparison counter 1902.

The process flow performed by the radio apparatus controller and the radio apparatus according to the embodiment of the present invention is described below with reference to FIG. 5, FIG. 10 through FIG. 13, FIG. 16 through FIG. 18, and FIG. 20.

FIG. 20 is a flowchart of the process performed by the radio apparatus controller and the radio apparatus according to the embodiment of the present invention.

In step 2001, the radio apparatus 52 converts the CPRI signal of the downlink DL-A received from the radio apparatus controller 51A into an electric signal by the photoelectric conversion unit 1001-A, and then allows the synchronous clock generation unit 1101 in the downlink CPRI signal processing unit 1002-A to generate a recovery clock A. The radio apparatus 52 starts its operation in synchronization with the generated recovery clock A, and establishes the line synchronization.

In step 2002, the radio apparatus 52 allows the uplink CPRI signal processing unit 1012-A to generate a CPRI signal of the uplink UL-A in synchronization with the generated recovery clock A, allows the electro-optical conversion unit 1013-A to convert the signal into an optical signal, and then transmits the resultant signal to the radio apparatus controller 51A. Simultaneously, the radio apparatus 52 allows the uplink CPRI signal processing unit 1012-B to generate a CPRI signal of the uplink UL-B in synchronization with the generated recovery clock A, allows the electro-optical conversion unit 1013-B to convert the signal into an optical signal, and then transmits the resultant signal to the radio apparatus controller 51B.

In step 2003, upon receipt of the CPRI signal of the downlink DL-B from the radio apparatus controller 51B, the radio apparatus 52 passes control to step 2004.

In step 2004, the radio apparatus 52 allows the clock synchronization detection unit 1202 to determine whether or not the recovery clock B generated by the synchronous clock generation unit 1101 of the downlink CPRI signal processing unit 1002-B is synchronous with the recovery clock A generated from the CPRI signal of the downlink DL-A in step 2001.

That is, the counters 1301A and 1301B in the clock synchronization detection unit 1202 simultaneously start counting up the clock pulses a specified number of times using the recovery clocks A and B as an input signal, respectively. Then, after counting up the clock pulses the specified number of times, the pulse detection unit 1303 determines the time position relationship between the count-up pulses output from the counters 1301A and 1301B.

When the time positions of the count-up pulses of the counters 1301A and 1301B are different, control is passed to step S2005. Then, the pulse detection unit 1303 outputs to the comma code selection unit 1203 the synchronization flag indicating that the recovery clock A and the recovery clock B are in the asynchronous state.

Upon receipt of the synchronization flag indicating that the recovery clock A and the recovery clock B are in the asynchronous state, the comma code selection unit 1203 selects as a comma code indicating the header of the hyperframe of the CPRI signal the comma code (for example, K28.6) indicating the asynchronous state. Then, the CPRI frame generation unit 1204 generates a CPRI frame including the comma code indicating the asynchronous state. The CPRI signal of the generated frame goes through the processes by the 8b/10b conversion unit 1205 and the electro-optical conversion unit 1013-B, and then is transmitted to the radio apparatus controller 51B through the CPRI line of the uplink UL-B.

After the process by the photoelectric conversion unit 1601, the radio apparatus controller 51B detects the comma code indicating the header of the CPRI signal of the uplink UL-B received from the radio apparatus 52 by the comma code detection unit 1703 of the uplink CPRI signal processing unit 1602.

When the comma code detection unit 1703 detects a comma code indicating the asynchronous state, the comma code detection unit 1703 outputs to the downlink CPRI signal processing unit 1607 a flag signal indicating that the operation clock of the radio apparatus controller 51B and the recovery clock generated according to the CPRI signal of the uplink UL-B are in the asynchronous state.

Upon receipt of the flag signal indicating the asynchronous state, the downlink signal transmission control unit 1805 of the downlink CPRI signal processing unit 1607 transmits to the electro-optical conversion unit 1608 a transmission disabled signal for suspending the transmission of the CPRI signal of the downlink DL-B. Upon receipt of the transmission disabled signal, the electro-optical conversion unit 1608 suspends the transmission of the CPRI signal of the downlink DL-B.

Furthermore, upon receipt of the flag signal indicating the asynchronous state, the operation clock synchronization establishment unit 1806 of the downlink CPRI signal processing unit 1607 performs the process of synchronizing the operation clock of the radio apparatus controller 51B with the recovery clock generated by the synchronous clock generation unit 1701 of the uplink CPRI signal processing unit. Then, upon completion of the synchronizing process, the operation clock synchronization establishment unit 1806 outputs the synchronization completion signal to the downlink signal transmission control unit 1805.

Upon receipt of the synchronization completion signal, the downlink signal transmission control unit 1805 outputs to the electro-optical conversion unit 1608 the transmission enabled signal for permission to transmit the CPRI signal of the downlink DL-B.

Upon receipt of the transmission enabled signal, the electro-optical conversion unit 1608 resumes transmitting the CPRI signal generated by the downlink CPRI signal processing unit 1607 to the radio apparatus 52. Then, control is returned to step 2003 in FIG. 20.

In step 2003, upon receipt of the CPRI signal of the downlink DL-B from the radio apparatus controller 51B, the radio apparatus 52 passes control to step 2004.

In step 2004, the radio apparatus 52 allows the clock synchronization detection unit 1202 to determines whether or not the recovery clock B generated by the synchronous clock generation unit 1101 of the downlink CPRI signal processing unit 1002-B is synchronous with the recovery clock A generated from the CPRI signal of the downlink DL-A.

If the clock synchronization detection unit 1202 determines that the recovery clock B is synchronous with the recovery clock A, control is passed to step 2006. Then, the clock synchronization detection unit 1202 outputs to the comma code selection unit 1203 the synchronization flag indicating that the recovery clock B and the recovery clock A are in the synchronous state.

Upon receipt of the synchronization flag indicating the synchronous state, the comma code selection unit 1203 selects a comma code (for example, K28.5) indicating the synchronous state as a comma code indicating the header of the hyperframe of the CPRI signal.

The CPRI frame generation unit 1204 generates a CPRI frame which includes the comma code indicating the synchronous state selected by the comma code selection unit 1203 as a comma code indicating the header of the hyperframe. Then, the radio apparatus 52 transmits the CPRI signal including the comma code indicating the synchronous state to the radio apparatus controller 51B through the uplink UL-B line after the processes by the 8b/10b conversion unit 1205 and the electro-optical conversion unit 1013-B.

As described above, according to the embodiment of the present invention, in the configuration in which a plurality of radio communication systems coexist, even if a reference clock receiver of a radio apparatus controller belonging to a radio communication system is removed, the synchronization of the operation clocks can be established between the respective radio apparatus controllers of the radio communication systems.

As a result, the error in data transfer such as a bit loss error etc., which can cause the degradation of line quality and the degradation of the throughput of the entire system, can be suppressed. In addition, it is not necessary to increase the circuit size of the radio apparatus to process the downlink signals received from each of radio apparatus controllers which are in the asynchronous state.

Figure 1:
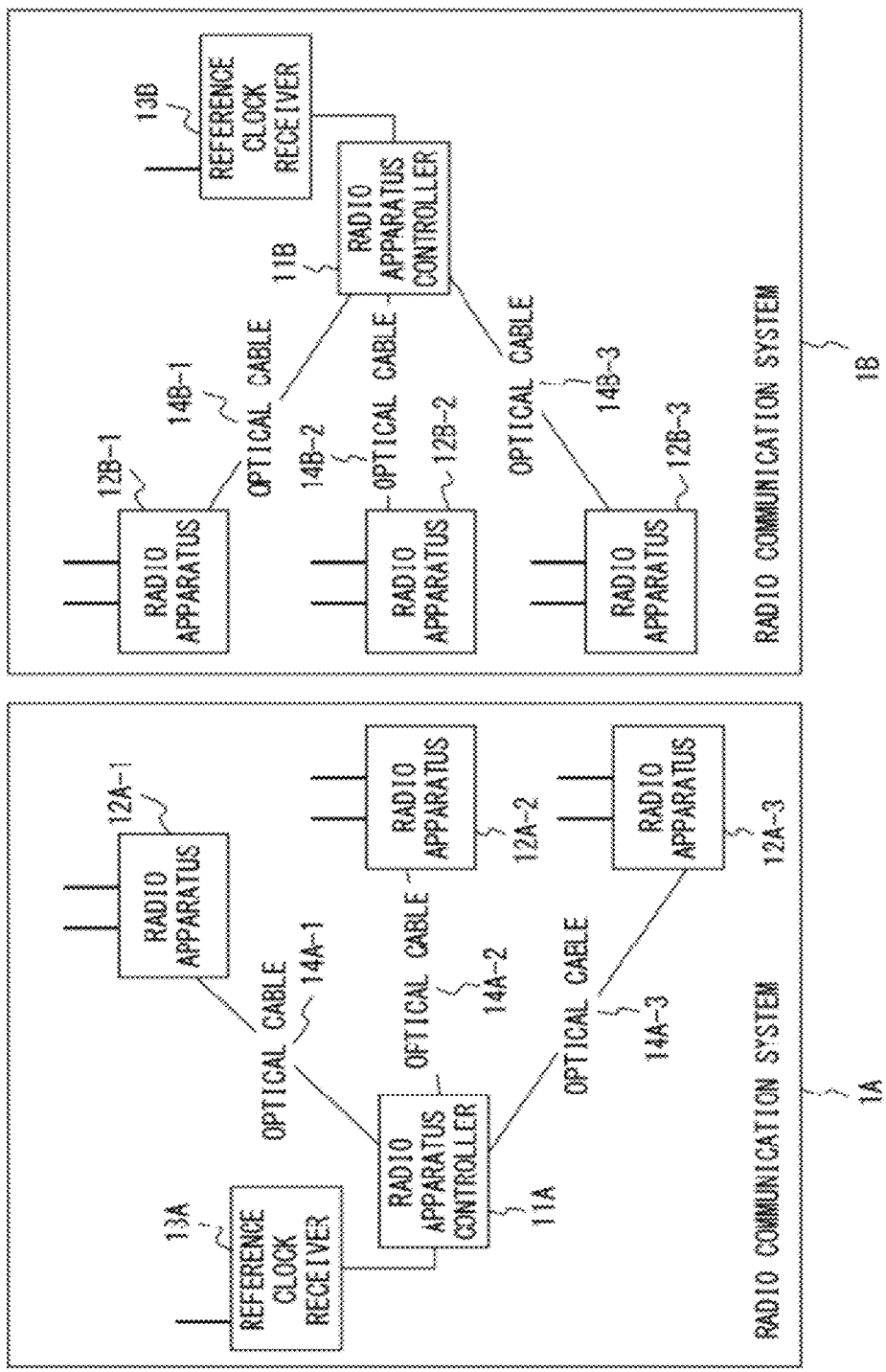
FIG. 1 illustrates the configuration in which a plurality of radio communication systems coexist in the prior art.
Figure 2:
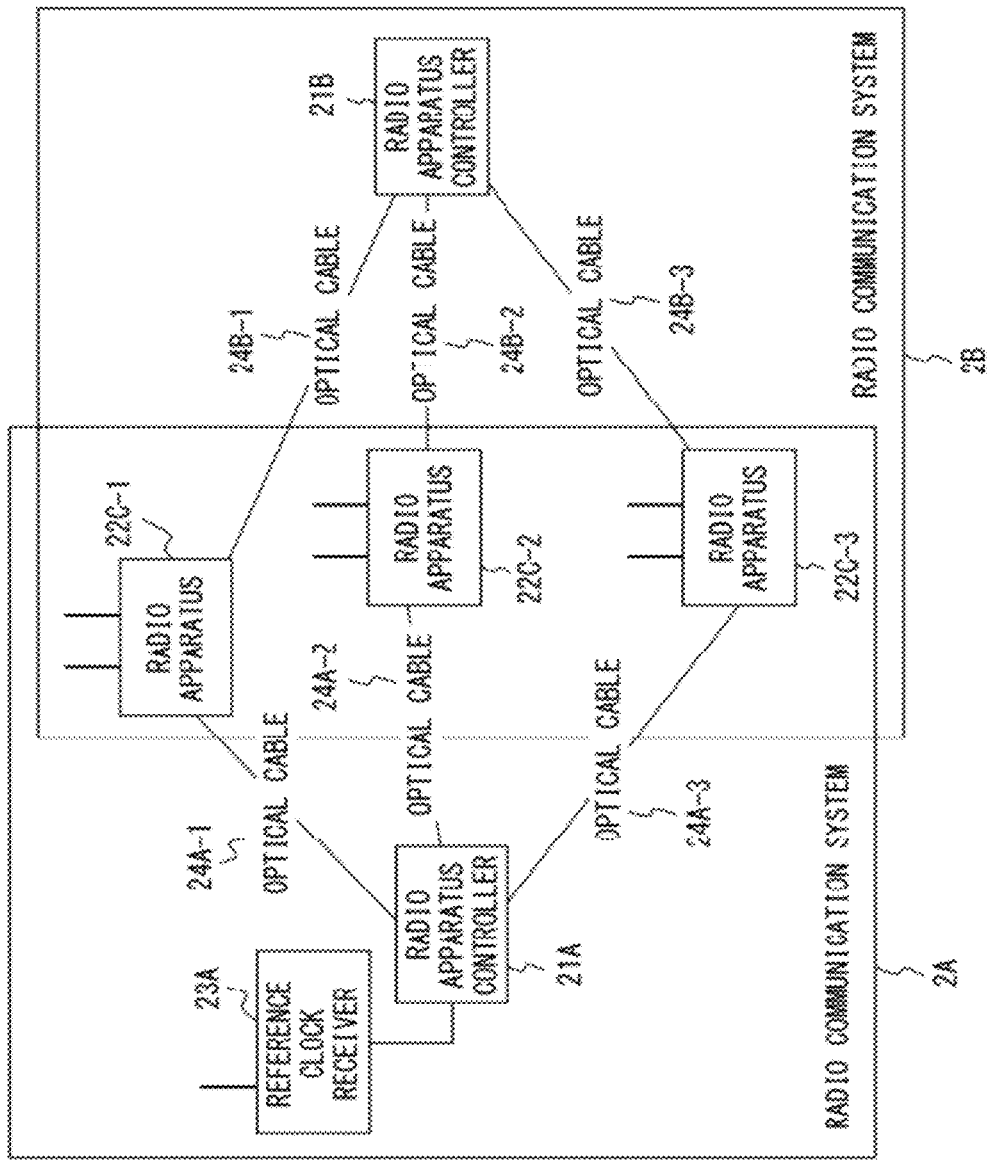
FIG. 2 illustrates the configuration in which there are a plurality of radio communication systems in which a radio apparatus is shared among a plurality of radio communication systems and a reference clock receiver is provided for one of the plurality of radio communication systems.

The radio apparatus, the radio apparatus controller, and the synchronization establishing method according to the above-mentioned embodiment can be used in other applications than in the configuration in which a plurality of different radio communication systems coexist as illustrated in FIG. 2 and FIG. 5.

For example, when a plurality of radio apparatus controllers share one radio apparatus in the same radio communication system, and a reference clock receiver of any radio apparatus controller in the plurality of radio apparatus controllers is removed, they can be used in establishing the synchronization of the operation clocks of the respective radio apparatus controllers.

The same radio communication system described above refers to the radio communication systems in which the same radio communication method are used. For example, each of the radio apparatus controllers belonging to the radio communication systems in which the same radio communication method such as the LTE etc. are used can be regarded as belonging to the same radio communication system. Furthermore, each of the radio apparatus controllers belonging to different radio communication networks which are operated by different common carriers but in which the same radio communication method are used can be regarded as belonging to the same radio communication system according to the embodiment of the present invention.

FIG. 21 illustrates the first example of the configuration of the same radio communication system.

Unlike the radio apparatus controllers 51A and 51B in the example of the configuration illustrated in FIG. 5, radio apparatus controllers 2101A and 2101B belong to the same radio communication system 2100.

FIG. 21 illustrates two radio apparatus controllers 2101A and 2101B and one radio apparatus 2102. However, it is not intended that the number of the radio apparatus controllers and radio apparatus included in the same radio communication system 2100 is limited to the number illustrated in FIG. 21.

For example, in the LTE, the multiple input multiple output (MIMO) technology is used as the technology of radio communications for increasing the transmission capacity.

Thus, for example, in the radio communication system in which the LTE is used, it is possible for the configuration as illustrated in FIG. 21, in which the radio apparatus 2102 can simultaneously transmit the data respectively received from the radio apparatus controllers 2101A and 2101B, using a plurality of antennas.

According to the example of the configuration illustrated in FIG. 21, as compared with the configuration in which a pair of the radio apparatus controller and the radio apparatus is connected, the number of radio apparatuses in the same radio communication system can be reduced.

Furthermore, as in the example of the configuration illustrated in FIG. 21, the number of reference clock receivers can be reduced by providing the reference clock receiver 53 to any radio apparatus controller 2101A between the plurality of radio apparatus controllers 2101A and 2101B.

However, if the number of reference clock receivers is reduced as in the example of the configuration illustrated in FIG. 21, the operation clocks between the radio apparatus controllers 2101A and 2101B can be placed in the asynchronous state. In the asynchronous state, if the data received from the radio apparatus controllers 2101A and 2101B is extracted by the radio apparatus 2102, an error in data transfer such as a bit loss error etc. occurs, and the degradation of line quality and the degradation of the throughput in the entire system occur. Furthermore, if the radio apparatus 2102 is configured to suppress the error in data transfer, the circuit size of the radio apparatus 2102 for processing the downlink signals received from the radio apparatus controllers 2101A and 2101B increases. Such problems are similar to those in the above-mentioned plurality of radio communication systems.

Thus, the configurations of the radio apparatus and the radio apparatus controller and the synchronization establishing method according to the embodiment in the plurality of radio communication systems described above with reference to FIG. 5 through FIG. 20 are used for the configurations of the radio apparatus and the radio apparatus controller and the synchronization establishing method in the same radio communication system illustrated in FIG. 21. For example, the radio apparatus controllers 2101A and 2101B and the radio apparatus 2102 perform the following processes.

The radio apparatus controller 2101A operates in synchronization with the reference clock generated stably and correctly by using an absolute time of the GPS signal etc. from the reference clock receiver 53. The radio apparatus controller 2101B starts its operation in synchronization with the built-in clock in the radio apparatus controller 2101B The radio apparatus 2102 receives the CPRI signal of the downlink DL-A transmitted from the radio apparatus controller 2101A. The radio apparatus 2102 generates a recovery clock by extracting the clock component superposed on the received CPRI signal of the downlink DL-A, and establishes the synchronization between the generated recovery clock and the operation clock of the radio apparatus 2102. Then, the radio apparatus 2102 transmits to the radio apparatus controller 2101A the CPRI signal of the uplink UL-A which is frequency-synchronous with the CPRI signal of the downlink DL-A.

Furthermore, the radio apparatus 2102 transmits to the radio apparatus controller 2101B the CPRI signal of the uplink UL-B frequency-synchronous with the CPRI signal of the downlink DL-A received from the radio apparatus controller 2101A at the same timing when the CPRI signal of the uplink UL-A is transmitted to the radio apparatus controller 2101A.

When the radio apparatus 2102 receives the CPRI signal of the downlink DL-B transmitted from the radio apparatus controller 2101B, the radio apparatus 2102 determines whether or not the recovery clock generated from the CPRI signal of the received downlink DL-B is synchronous with the recovery clock generated from the CPRI signal of the downlink DL-A. If the radio apparatus 2102 determines they are asynchronous with each other, the radio apparatus 2102 notifies the radio apparatus controller 2101B of the information which indicates the asynchronous state and is put in the CPRI signal of the uplink UL-B.

The radio apparatus controller 2101B receives the CPRI signal of the uplink UL-B from the radio apparatus 2102. When the received CPRI signal of the uplink UL-B includes the information indicating the asynchronous state, the radio apparatus controller 2101B synchronizes the operation clock of the radio apparatus controller 2101B with the recovery clock generated from the received CPRI signal of the uplink UL-B.

Furthermore, the radio apparatus controller 2101B suspends transmitting the CPRI signal of the downlink DL-B to the radio apparatus 2102 while performing the process of synchronizing the operation clock with the recovery clock. When the operation clock is synchronized with the recovery clock, the radio apparatus controller 2101B resumes transmitting the CPRI signal of the downlink DL-B to the radio apparatus 2102.

According to the embodiment of the present invention, even if the reference clock receiver of the radio apparatus controller is reduced in the same radio communication system, the synchronization of the operation clocks between the radio apparatus controllers can be established.

As a result, an error in data transfer such as a bit loss error etc., which can cause the degradation of the line quality and the degradation of the throughput in the entire system, can be suppressed. In addition, it is not necessary to increase the circuit size of the radio apparatus to process the downlink signals received from respective radio apparatus controllers in the asynchronous state.

Furthermore, in the embodiment of the present invention, a method of the radio apparatus 2102 notifying the radio apparatus controller 2101B that the operation clock of the radio apparatus controller 2101B is in the asynchronous state can be realized by inserting into the comma byte indicating the header of the hyperframe of the CPRI signal a different comma code (K code) depending on the synchronous state or the asynchronous state.

That is, when the operation clock of the radio apparatus controller 2101B is in the synchronous state, the radio apparatus 2102 selects a comma code (for example, K28.5) indicating the synchronous state as a comma code indicating the header of the hyperframe of the CPRI signal to be transmitted to the radio apparatus controller 2101B.

When the operation clock of the radio apparatus controller 2101B is in the asynchronous state, the radio apparatus 2102 selects the comma code (for example, K28.6) indicating the asynchronous state as a comma code indicating the header of the hyperframe of the CPRI signal to be transmitted to the radio apparatus controller 2101B.

The radio apparatus controller 2101B can determine whether or not the radio apparatus controller 2101B is in the synchronous state by detecting the code indicating the header of the hyperframe of the CPRI signal received from the radio apparatus 2102 as a comma code indicating the synchronous state or a comma code indicating the asynchronous state.

The comma code included in the comma byte of the hyperframe of the CPRI signal is a unique 10-bit string which can be distinguished from the code (D code) assigned to data. Therefore, if the value of a bit loss error (ERROR) in the radio apparatus controller 2101B is $\frac{1}{10}$ or less, then the radio apparatus controller 2101B can detect from the CPRI signal received from the radio apparatus 2102 whether or not the operation clock of the radio apparatus controller 2101B is in the synchronous state. That is, even when the frequency deviation is somewhat large between the operation clock of the radio apparatus controller 2101A and the operation clock of the radio apparatus controller 2101B, the radio apparatus controller 2101B can detect the asynchronous state of the radio apparatus controller 2101B according to the CPRI signal received from the radio apparatus 2102 unless the value of the bit loss error (ERROR) exceeds $\frac{1}{10}$.

FIG. 22 illustrates the second example of the configuration of the same radio communication system.

Unlike the radio apparatus controllers 51A and 51B of the example of the configuration illustrated in FIG. 5, radio apparatus controllers 2201A and 2201B belong to the same radio communication system 2200.

FIG. 22 illustrates two radio apparatus controllers 2201A and 2201B and two radio apparatus 2202A and 2202B. However, it is not intended that the numbers of the radio apparatus controllers and radio apparatuses which are included in the same radio communication system 22 are limited to the numbers illustrated in FIG. 22.

In the example of the configuration illustrated in FIG. 22, the CPRI signal including the user data is transmitted between the radio apparatus controller 2201A and the radio apparatus 2202A. In addition, the CPRI signal including the user data is transmitted between the radio apparatus controller 2201B and the radio apparatus 2202B.

The reference clock receiver provided for the radio apparatus controller is to be installed in the place where radio waves to be referenced for generation of a reference clock, such as the GPS signal etc., can be received. However, the place where the installation of the radio apparatus controller is requested is not always the place where radio waves can be received by the reference clock receiver. In order to remove the restriction on the installation of the radio apparatus controller such that the radio apparatus controller is to be installed in the place where the reference clock receiver can receive radio waves, it is necessary to synchronize the operation clock of the radio apparatus controller not provided with the reference clock receiver with the operation clock of the radio apparatus controller provided with the reference clock receiver.

Then, as illustrated in FIG. 22, the radio apparatus controller 2201B not provided with the reference clock receiver is connected to the radio apparatus 2202A connected to the radio apparatus controller 2201A provided with the reference clock receiver 53.

In FIG. 22, the downlink DL-AB refers to the downstream CPRI connection from the radio apparatus controller 2201B to the radio apparatus 2202A. The uplink UL-AB refers to the upstream CPRI connection from the radio apparatus 2202A to the radio apparatus controller 2201B.

Although no user data is transferred between the radio apparatus controller 2201B and the radio apparatus 2202A, the CPRI signal for establishment of synchronization between the radio apparatus controller 2201A and the radio apparatus controller 2201B is transmitted.

For the configuration of the radio apparatus 2202A, the radio apparatus controller 2201A, and the radio apparatus controller 2201B and the synchronization establishing method using the above-mentioned CPRI signal, the configuration of the radio apparatus 52, the radio apparatus controller 51A, and radio apparatus controller 51B and the synchronization establishing method described with reference to FIG. 5 through FIG. 20 can be used.

According to the embodiment of the present invention, the operation clock of the radio apparatus controller not provided with a reference clock receiver can be synchronized with the operation clock of the radio apparatus controller provided with a reference clock receiver in the same radio communication system.

As a result, the restriction on the installation of the radio apparatus controller such that the radio apparatus controller is to be installed in the place where the reference clock receiver can receive radio waves can be removed.

In the embodiment of the present invention, a method of the radio apparatus 2202A notifying the radio apparatus controller 2201B of the asynchronous state of the operation clock of the radio apparatus controller 2201B can be realized by inserting different comma codes (K codes) between the case in the synchronous state and the case in the asynchronous state into the comma byte indicating the header of the hyperframe of the CPRI signal.

Therefore, even if the frequency deviation between the operation clock of the radio apparatus controller 2201A and the operation clock of the radio apparatus controller 2201B is somewhat large, the radio apparatus controller 2201B can detect from the CPRI signal received from the radio apparatus 2202A that the radio apparatus controller 2201B is in the asynchronous state unless the value of the bit loss error (ERROR) in the radio apparatus controller 2201B exceeds $\frac{1}{10}$.

Finally, examples of the hardware configurations of the radio apparatus according to the prior art, and the radio apparatus and radio apparatus controller according to the embodiments of the present invention are described below with reference to FIG. 23 through FIG. 25.

Figure 23:
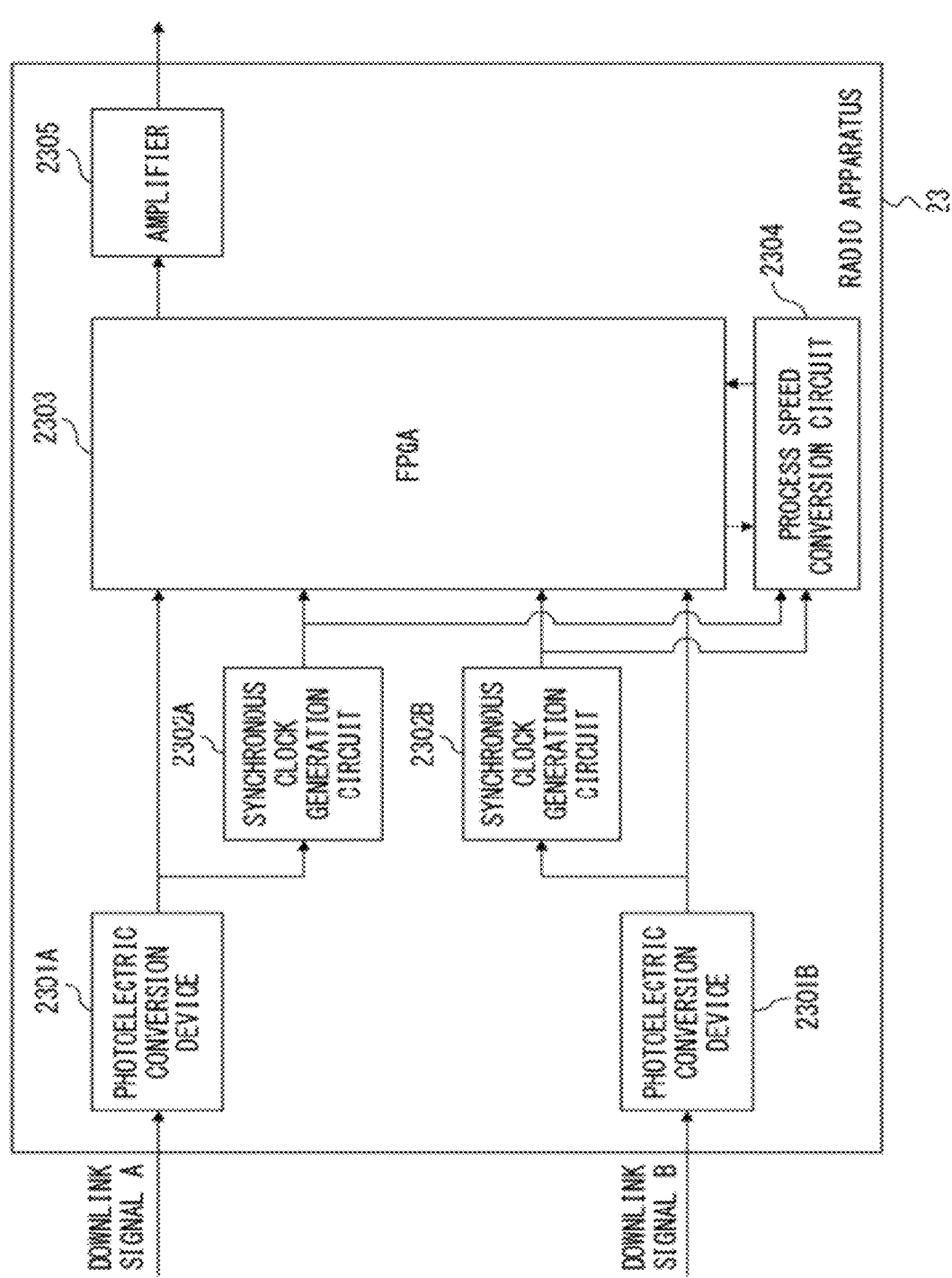
FIG. 23 illustrates an example of the hardware configuration of the conventional radio apparatus when the frequency synchronization is not attained between the downlink signals received from a plurality of radio apparatus controllers.

FIG. 23 illustrates an example of the configuration of the hardware of the conventional radio apparatus when the frequency synchronization is not attained between the downlink signals received from a plurality of radio apparatus controllers.

Figure 4:
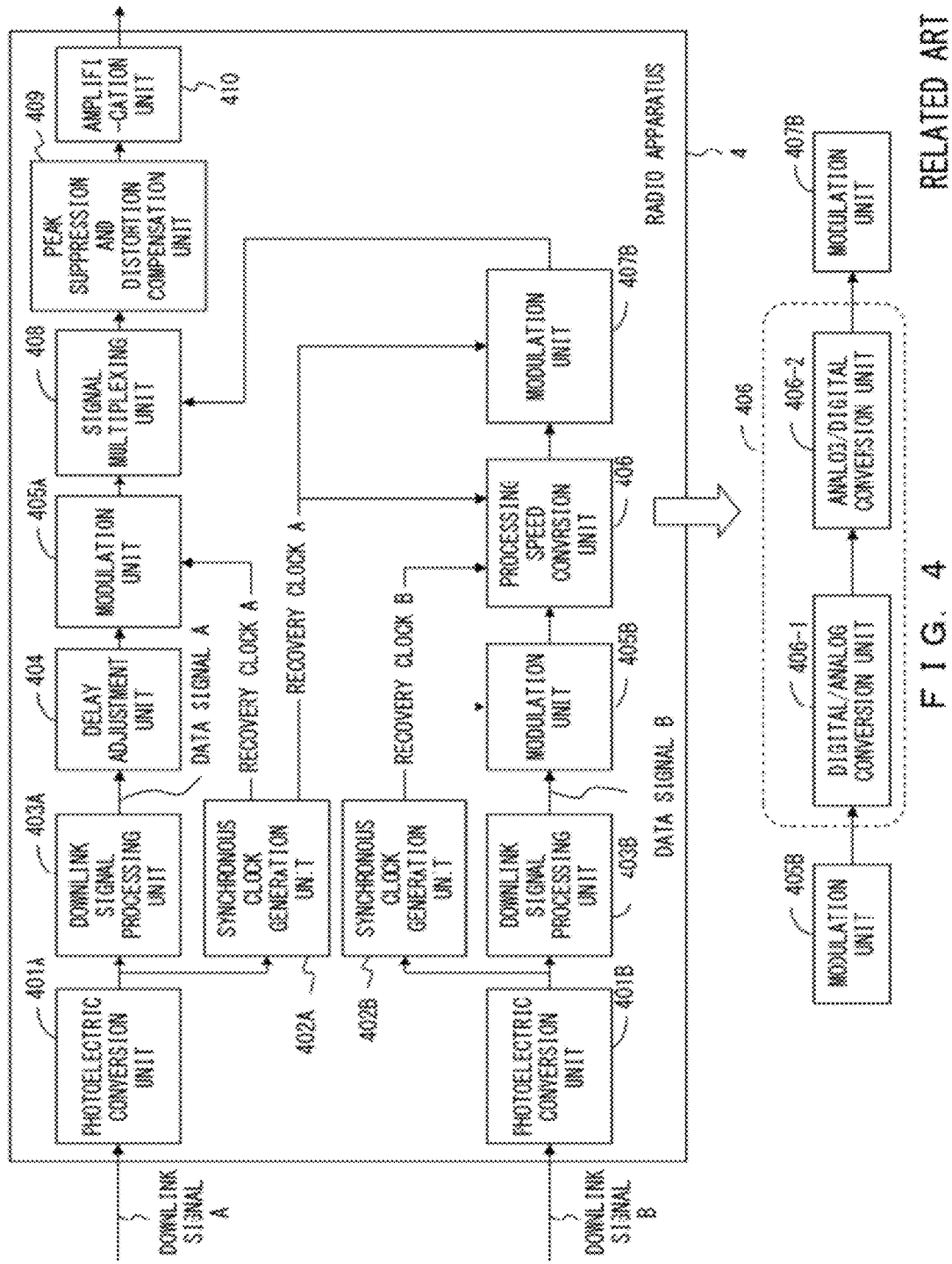
FIG. 4 is an example of the conventional circuit configuration of a radio apparatus when the frequency synchronization is not attained between the downlink signals received from a plurality of radio apparatus controllers.

The photoelectric conversion unit 401A of the radio apparatus 4 in FIG. 4 can be a photoelectric conversion device 2301A. The photoelectric conversion unit 401B can be a photoelectric conversion device 2301B.

The synchronous clock generation unit 402A can be a synchronous clock generation circuit 2302A. The synchronous clock generation unit 402B can be a synchronous clock generation circuit 2302B.

The downlink signal processing units 403A and 403B, the delay adjustment unit 404, the modulation units 405A, 405B, and 407B, the signal multiplexing unit 408, and the peak suppression and distortion compensation unit 409 can be a field programmable gate array (FPGA) 2303.

The amplification unit 410 can be an amplifier 2305.

Figure 24:
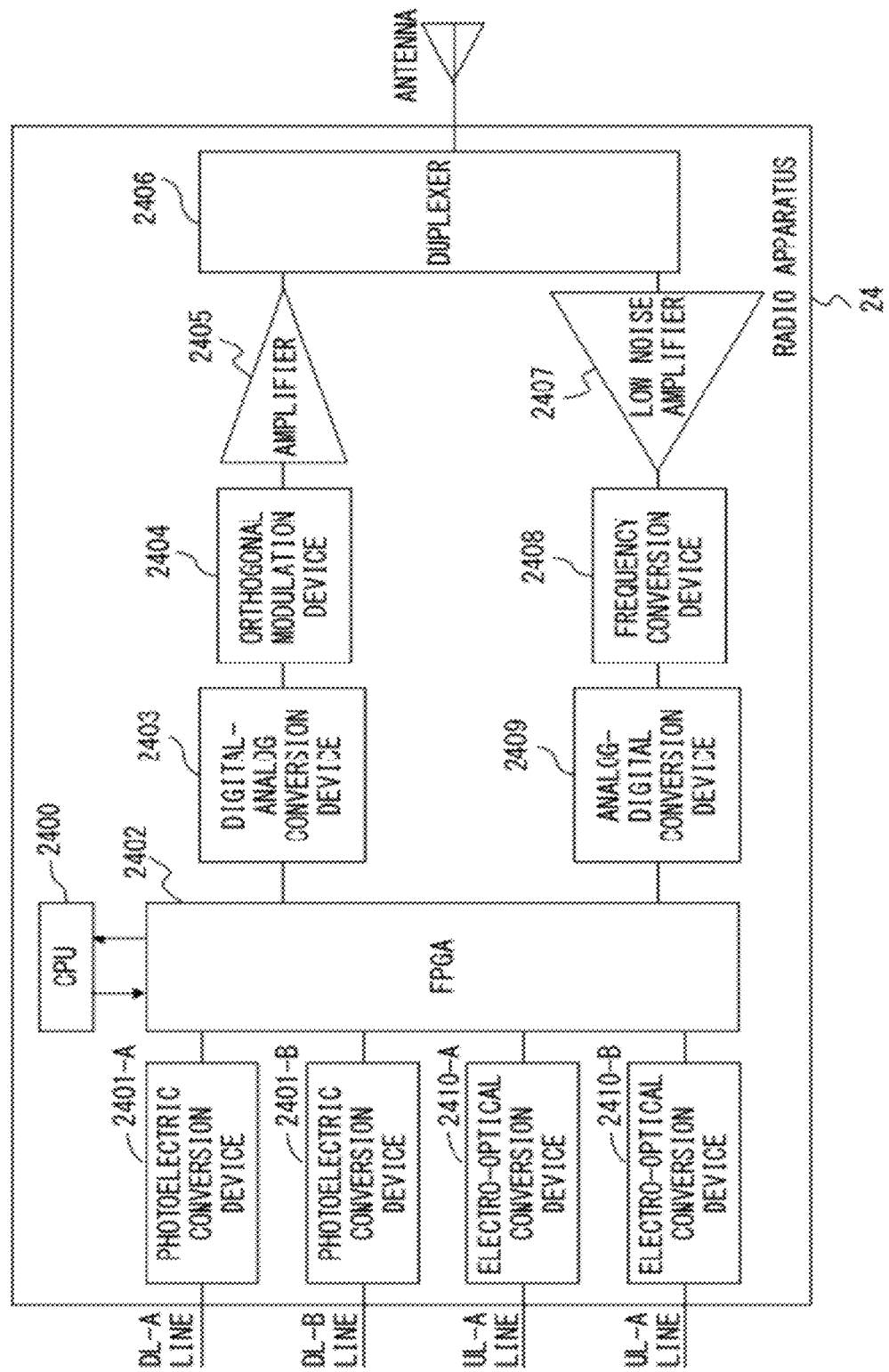
FIG. 24 illustrates an example of the hardware configuration of the radio apparatus according to an embodiment of the present invention.

FIG. 24 illustrates an example of a configuration of the hardware of the radio apparatus according to an embodiment of the present invention.

The central processing device 1000 of the radio apparatus 10 illustrated in FIG. 10 can be a central processing unit (CPU) 2400 of radio apparatus 24 illustrated in FIG. 24.

The photoelectric conversion unit 1001-A can be a photoelectric conversion device 2401-A. The photoelectric conversion unit 1001-B can be a photoelectric conversion device 2401-B.

The downlink CPRI signal processing units 1002-A and 1002-B, the downlink IQ data processing unit 1003, the uplink IQ data processing unit 1011, and the uplink CPRI signal processing units 1012-A and 1012-B can be an FPGA 2402.

The digital-analog conversion unit 1004 can be a digital-analog conversion device 2403. The orthogonal modulation unit 1005 can be an orthogonal modulation device 2404. the amplifier 1006 can be an amplifier 2405. The duplexer 1007 can be a duplexer 2406.

The low noise amplifier 1008 can be a low noise amplifier 2407. The frequency conversion unit 1009 can be a frequency conversion device 2408. The analog-digital conversion unit 1010 can be an analog-digital conversion device 2409.

The electro-optical conversion unit 1013-A can be an electro-optical conversion device 2410-A. The electro-optical conversion unit 1013-B can be an electro-optical conversion device 2410-B.

FIG. 25 illustrates an example of a configuration of the hardware of the radio apparatus controller according to the embodiment of the present invention.

The central processing device 1600 of the radio apparatus controller 16 in FIG. 16 can be a CPU 2500 of a radio apparatus controller 25 in FIG. 25.

The photoelectric conversion unit 1601 can be a photoelectric conversion device 2501.

The uplink CPRI signal processing unit 1602, the IQ data baseband demodulation unit 1603, the format conversion units 1604 and 1605, the IQ data baseband modulation unit 1606, and the downlink CPRI signal processing unit 1607 can be an FPGA 2502.

The electro-optical conversion unit 1608 can be an electro-optical conversion device 2503.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio apparatus comprising:
a first reception unit configured to receive a first signal from a first radio apparatus controller;
a first synchronous clock generation unit configured to generate a first recovery clock from a clock component included in the first signal received by the reception unit;
a second reception unit configured to receive a second signal from a second radio apparatus controller;
a second synchronous clock generation unit configured to generate a second recovery clock from a clock component included in the second signal received by the reception unit;
a clock synchronization detection unit configured to detect whether or not the second recovery clock is synchronous with the first recovery clock;
a code selection unit configured to select a code indicating whether or not the second recovery clock is synchronized with the first recovery clock according to a detection result of the synchronization detection unit;
a signal processing unit configured to generate a third signal to which the code selected by the code selection unit is added and which is synchronous with the first recovery clock; and
a transmission unit configured to transmit the third signal generated by the signal processing unit to the second radio apparatus controller.

2. The radio apparatus according to claim 1, wherein the code selected by the code selection unit is a code indicating a header of a frame of the third signal to be transmitted to the second radio apparatus controller.

3. A radio apparatus controller comprising:
a reception unit configured to receive from a radio apparatus a third signal to which a code selected depending on whether or not a first recovery clock generated from a first signal received from a first radio apparatus controller and a second recovery clock generated from a second signal received from a second radio apparatus controller are synchronous with each other is added;
a code detection unit configured to detect a code included in the third signal received by the reception unit;
an operation clock synchronization establishment unit configured to synchronize an operation clock with a third recovery clock generated from the third signal received from the radio apparatus according to the code detected by the code detection unit;
a signal processing unit configured to generate a fourth signal according to the operation clock synchronized by the operation clock synchronization establishment unit; and
a transmission unit configured to transmit the fourth signal generated by the signal processing unit to the radio apparatus.

4. The radio apparatus controller according to claim 3, further comprising
a transmission signal control unit configured to control whether or not a transmission of the fourth signal to the radio apparatus is permitted according to the code detected by the code detection unit.

5. The radio apparatus controller according to claim 3, wherein
the code included in the third signal received from the radio apparatus is a code indicating a header of the signal.

6. A synchronization establishing method comprising:
receiving by a radio apparatus a first signal from a first radio apparatus controller;

generating by the radio apparatus a first recovery clock from a clock component included in the first signal;
receiving by the radio apparatus a second signal from a second radio apparatus controller;
generating by the radio apparatus a second recovery clock from a clock component included in the second signal;
detecting by the radio apparatus whether or not the second recovery clock is synchronous with the first recovery clock;
selecting by the radio apparatus a code indicating whether or not the second recovery clock is synchronized with the first recovery clock according to a detection result;
generating by the radio apparatus a third signal to which the selected code is added and which is synchronous with the first recovery clock;
transmitting by the radio apparatus the generated third signal to the second radio apparatus controller;
receiving by the second radio apparatus controller the third signal transmitted from the radio apparatus;
detecting by the second radio apparatus controller a code included in the received third signal;
synchronizing by the second radio apparatus controller an operation clock with a third recovery clock generated from the third signal received from the radio apparatus according to the detected code;
generating by the second radio apparatus controller a fourth signal according to the synchronized operation clock; and
transmitting by the second radio apparatus controller the generated fourth signal to the radio apparatus.

7. The synchronization establishing method according to claim 6, wherein
the second radio apparatus controller controls whether or not a transmission of a signal to the radio apparatus is permitted according to the detected code.

8. The synchronization establishing method according to according to claim 6, wherein
the code to be added to the third signal transmitted by the radio apparatus to the second radio apparatus controller is a code indicating a head of the third signal.

9. A radio apparatus comprising:
a first reception unit configured to receive a first signal from a first radio apparatus controller included in a first radio communication system;
a first synchronous clock generation unit configured to generate a first recovery clock from a clock component included in the first signal received by the reception unit;
a second reception unit configured to receive a second signal from a second radio apparatus controller included in a second radio communication system;
a second synchronous clock generation unit configured to generate a second recovery clock from a clock component included in the second signal received by the reception unit;
a clock synchronization detection unit configured to detect whether or not the second recovery clock is synchronous with the first recovery clock;
a code selection unit configured to select a code indicating whether or not the second recovery clock is synchronized with the first recovery clock according to a detection result of the synchronization detection unit;
a signal processing unit configured to generate a third signal to which the code selected by the code selection unit is added and which is synchronous with the first recovery clock; and a transmission unit configured to transmit the third signal generated by the signal processing unit to the second radio apparatus controller, wherein
the radio apparatus is shared by the first and second radio communication systems.

10. The radio apparatus according to claim 9, wherein
the first and second radio communication systems are different radio communication systems.

11. The radio apparatus according to claim 9, wherein
the first and second radio communication systems are the same radio communication systems.

12. A radio apparatus controller comprising:
a reception unit configured to receive from a radio apparatus shared by first and second radio communication systems a third signal to which a code selected depending on whether or not a first recovery clock generated from a first signal received from a first radio apparatus controller included in the first radio communication system and a second recovery clock generated from a second signal received from a second radio apparatus controller included in the second radio communication system are synchronous with each other is added;
a code detection unit configured to detect a code included in the third signal received by the reception unit;
an operation clock synchronization establishment unit configured to synchronize an operation clock with a third recovery clock generated from the third signal received from the radio apparatus according to the code detected by the code detection unit;
a signal processing unit configured to generate a fourth signal according to the operation clock synchronized by the operation clock synchronization establishment unit; and
a transmission unit configured to transmit the fourth signal generated by the signal processing unit to the radio apparatus, wherein
the radio apparatus controller is included in the second radio communication system.

13. The radio apparatus controller according to claim 12, wherein
the first and second radio communication systems are different radio communication systems.

14. The radio apparatus controller according to claim 12, wherein
the first and second radio communication systems are the same radio communication systems.

15. A synchronization establishing method comprising:
receiving a first signal from a first radio apparatus controller included in a first radio communication system by a radio apparatus shared by the first and a second radio communication systems;
generating by the radio apparatus a first recovery clock from a clock component included in the first signal;
receiving by the radio apparatus a second signal from a second radio apparatus controller included in the second radio communication system;
generating by the radio apparatus a second recovery clock from a clock component included in the second signal;
detecting by the radio apparatus whether or not the second recovery clock is synchronous with the first recovery clock;
selecting by the radio apparatus a code indicating whether or not the second recovery clock is synchronized with the first recovery clock according to a detection result;
generating by the radio apparatus a third signal to which the selected code is added and which is synchronous with the first recovery clock;

transmitting by the radio apparatus the generated third signal to the second radio apparatus controller;

receiving by the second radio apparatus controller the third signal transmitted from the radio apparatus;

detecting by the second radio apparatus controller a code included in the received third signal;

synchronizing by the second radio apparatus controller an operation clock with a third recovery clock generated from the third signal received from the radio apparatus according to the detected code;

generating by the second radio apparatus controller a fourth signal according to the synchronized operation clock; and transmitting by the second radio apparatus controller the generated fourth signal to the radio apparatus.

16. The synchronization establishing method according to claim 15, wherein
the first and second radio communication systems are different radio communication systems.

17. The synchronization establishing method according to claim 15, wherein
the first and second radio communication systems are the same radio communication systems.

\* \* \* \* \*